(12) United States Patent
Fan et al.

(10) Patent No.: US 11,658,807 B2
(45) Date of Patent: May 23, 2023

(54) CIRCUIT FOR PERFORMING HASH ALGORITHM, COMPUTING CHIP, DATA PROCESSING DEVICE AND METHOD

(71) Applicant: SHENZHEN MICROBT ELECTRONICS TECHNOLOGY CO., LTD., Guangdong (CN)

(72) Inventors: Zhijun Fan, Guangdong (CN); Ke Xue, Guangdong (CN); Chao Xu, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/630,881

(22) PCT Filed: Jul. 9, 2021

(86) PCT No.: PCT/CN2021/105350
§ 371 (c)(1),
(2) Date: Jan. 27, 2022

(87) PCT Pub. No.: WO2022/127085
PCT Pub. Date: Jun. 23, 2022

(65) Prior Publication Data
US 2022/0376893 A1    Nov. 24, 2022

(30) Foreign Application Priority Data

Dec. 18, 2020 (CN) .......................... 202011509432.7

(51) Int. Cl.
*H04L 9/06* (2006.01)
(52) U.S. Cl.
CPC ................. *H04L 9/0643* (2013.01)

(58) Field of Classification Search
CPC ....... G06Q 20/40; G06Q 20/06; H04L 9/0643; H04L 9/06; G06F 17/10; G06F 16/13
(Continued)

(56) References Cited

U.S. PATENT DOCUMENTS

| 7,376,685 B2 * | 5/2008 | Lee ....................... H04L 9/0643 |
| | | 708/200 |
| 7,962,753 B2 * | 6/2011 | Satou .................... H04L 9/0643 |
| | | 713/168 |

(Continued)

FOREIGN PATENT DOCUMENTS

| CN | 108427575 A | 8/2018 |
| CN | 110543481 A | 12/2019 |

(Continued)

OTHER PUBLICATIONS

International Search Report and Written Opinion dated Oct. 11, 2021 in International Application No. PCT/CN2021/105350.

(Continued)

*Primary Examiner* — Amare F Tabor
(74) *Attorney, Agent, or Firm* — Venable LLP

(57) ABSTRACT

The present disclosure relates to a circuit for performing a hash algorithm, computing chip, data processing device and method. A circuit includes: operation stages in a pipeline structure each including 0th to 15th expansion registers; expansion data operation logic modules each disposed between two adjacent operation stages including a first operation stage and its subsequent second operation stage, and including a first sub-module configured to compute data in a 0th expansion register of the second operation stage based on data in a 1st expansion register of the first operation stage and a second sub-module configured to compute data in a 15th expansion register of the second operation stage based on data in a 0th expansion register of the first operation stage: data in an (i−1)th expansion register of the (Continued)

second operation stage is data in an ith expansion register of the first operation stage.

20 Claims, 13 Drawing Sheets

(58) Field of Classification Search
USPC .......................................................... 713/170
See application file for complete search history.

(56) References Cited

U.S. PATENT DOCUMENTS

| | | | | |
|---|---|---|---|---|
| 8,086,864 | B2* | 12/2011 | Kim | G06F 21/602 |
| | | | | 713/181 |
| 8,712,039 | B2* | 4/2014 | Ebeid | H04L 9/0643 |
| | | | | 713/168 |
| 8,954,754 | B2* | 2/2015 | Yap | H04L 9/3239 |
| | | | | 713/190 |
| 9,960,909 | B2* | 5/2018 | Karighattam | H04L 9/0643 |
| 10,020,934 | B2* | 7/2018 | Suresh | H04L 9/0643 |
| 10,097,345 | B2* | 10/2018 | Agrawal | H04L 9/3239 |
| 10,686,591 | B2* | 6/2020 | Wolrich | H04L 9/0643 |
| 10,979,214 | B2* | 4/2021 | Denham | H04L 9/3239 |
| 2004/0260740 | A1 | 12/2004 | Liu | |
| 2005/0089160 | A1* | 4/2005 | Crispin | G06F 9/3895 |
| | | | | 712/E9.032 |
| 2008/0215849 | A1 | 9/2008 | Scott | |
| 2011/0219150 | A1 | 9/2011 | Piccirillo et al. | |
| 2016/0147551 | A1 | 5/2016 | Tsirkin et al. | |
| 2017/0134163 | A1 | 5/2017 | Suresh et al. | |

FOREIGN PATENT DOCUMENTS

| | | |
|---|---|---|
| CN | 111612622 A | 5/2020 |
| CN | 111930682 A | 11/2020 |
| TW | 201131372 A | 9/2011 |
| TW | 201717573 A | 5/2017 |

OTHER PUBLICATIONS

Office Action dated Mar. 4, 2022 in Taiwanese Patent Application No. 110125266.

* cited by examiner

CIRCUIT FOR PERFORMING HASH ALGORITHM, COMPUTING CHIP, DATA PROCESSING DEVICE AND METHOD

CROSS-REFERENCE TO RELATED APPLICATIONS

This application is a national stage of International Application No. PCT/CN2021/105350, filed on Jul. 9, 2021, which claims priority to Chinese Patent Application No. 202011509432.7, filed on Dec. 18, 2020. Both of the aforementioned applications are hereby incorporated by reference in their entireties.

TECHNICAL FIELD

The present disclosure generally relates to a circuit for performing a hash algorithm, computing chip, data processing device (e.g., a crypto currency mining machine), and related method.

BACKGROUND

Bitcoin is a virtual crypto digital currency in a form of P2P (Peer-to-Peer), the concept of which was originally proposed by Satoshi Nakamoto on Nov. 1, 2008 and formally came into being on Jan. 3, 2009. Bitcoin is unique in that it is not issued by a specific monetary institution, but is generated through a large amount of operations according to a specific algorithm. For a Bitcoin transaction, a distributed database composed of numerous nodes throughout a P2P network is used to validate and record all transactions, and the design of cryptography is used to ensure their security. From the perspective of cryptography, Bitcoin is a proof of work (POW) based on a hash algorithm SHA-256, and its transaction integrity depends on collision and pre-image resistance of the SHA-256. The hash algorithm is an algorithm that takes variable-length data as input and generates a fixed-length hash value as output, the essence of which is a distillation of information. Since 1993, the US National Institute of Standards and Technology has successively designed and issued several versions of secure hash algorithms (SHAs), and the SHA-256 is one of the secure Hash algorithms with a hash length of 256 bits.

The core of Bitcoin mining using a mining machine is that a reward is obtained according to the operation capability of computing the SHA-256 by the mining machine. For the mining machine, chip's size, chip's running speed and chip's power consumption are three factors crucial to the performance of the mining machine, wherein the chip's size decides chip's cost, the chip's running speed decides mining machine's running speed, i.e., hash rate, and the chip's power consumption decides a degree of consumed electricity, i.e., mining cost. In a practical application, a most important performance index for measuring the mining machine is power consumption consumed by unit hash rate, i.e., a ratio of power consumption to hash rate. To improve security, the SHA-256 is performed twice in a Bitcoin protocol. Therefore, it is most important for the Bitcoin mining machine to implement the hash algorithm SHA-256 with lower ratio of power consumption to hash rate.

SUMMARY

According to a first aspect of the present disclosure, there is provided a circuit for performing a hash algorithm, comprising: an input module configured to receive data; and an operation module configured to compute a hash value based on the received data, the operation module comprising: a plurality of operation stages arranged in a pipeline structure, each operation stage of the plurality of operation stages comprising 0th to 15th expansion registers, each expansion register being configured to store expansion data of the current operation stage; and a plurality of expansion data operation logic modules, each expansion data operation logic module being disposed between two respective adjacent operation stages of the plurality of operation stages, the two adjacent operation stages comprising a first operation stage and a second operation stage after the first operation stage, each expansion data operation logic module comprising: a first sub-module configured to compute expansion data for storage into a 0th expansion register of the second operation stage based on expansion data stored in a 1st expansion register of the first operation stage; and a second sub-module configured to compute expansion data for storage into a 15th expansion register of the second operation stage based on expansion data stored in a 0th expansion register of the first operation stage, wherein expansion data for storage into an (i−1)th expansion register of the second operation stage is expansion data stored in an ith expansion register of the first operation stage, where $2 \leq i \leq 15$ and i is an integer.

According to a second aspect of the present disclosure, there is provided a circuit for performing a hash algorithm, comprising: an input module configured to receive data; and an operation module configured to compute a hash value based on the received data, the operation module comprising: a plurality of operation stages arranged in a pipeline structure, each operation stage of the plurality of operation stages comprising 0th to 15th expansion registers and an additional register, each expansion register being configured to store expansion data of the current operation stage, the additional register being configured to store intermediate data for computing expansion data; and a plurality of expansion data operation logic modules, each expansion data operation logic module being disposed between two respective adjacent operation stages of the plurality of operation stages, the two adjacent operation stages comprising a first operation stage and a second operation stage after the first operation stage, each expansion data operation logic module comprising: a first sub-module configured to compute intermediate data for storage into an additional register of the second operation stage based on expansion data stored in an expansion register of the first operation stage; and a second sub-module configured to compute expansion data for storage into a 15th expansion register of the second operation stage based on intermediate data stored in an additional register of the first operation stage, wherein expansion data for storage into an (i−1)th expansion register of the second operation stage is expansion data stored in an ith expansion register of the first operation stage, where $1 \leq i \leq 15$ and i is an integer.

According to a third aspect of the present disclosure, there is provided a computing chip comprising the circuit as described in the above aspects.

According to a fourth aspect of the present disclosure, there is provided a data processing device comprising one or more computing chips as described in the above aspect.

According to a fifth aspect of the present disclosure, there is provided a method of computing expansion data in a circuit for performing a hash algorithm, the circuit comprising an input module configured to receive data and an operation module configured to compute a hash value based on the received data, the operation module comprising a plurality of operation stages arranged in a pipeline structure, each operation stage of the plurality of operation stages comprising 0th to 15th expansion registers, each expansion register being configured to store expansion data of the current operation stage, the method comprising: for two adjacent operation stages of the plurality of operation stages which comprise a first operation stage and a second operation stage after the first operation stage: computing expansion data for storage into a 0th expansion register of the second operation stage based on expansion data stored in a 1st expansion register of the first operation stage; computing expansion data for storage into a 15th expansion register of the second operation stage based on expansion data stored in a 0th expansion register of the first operation stage; and taking expansion data stored in an ith expansion register of the first operation stage as expansion data for storage into an (i−1)th expansion register of the second operation stage, where 2≤i≤15 and i is an integer.

According to a sixth aspect of the present disclosure, there is provided a method of computing expansion data in a circuit for performing a hash algorithm, the circuit comprising an input module configured to receive data and an operation module configured to compute a hash value based on the received data, the operation module comprising a plurality of operation stages arranged in a pipeline structure, each operation stage of the plurality of operation stages comprising 0th to 15th expansion registers and an additional register, each expansion register being configured to store expansion data of the current operation stage, the additional register being configured to store intermediate data for computing expansion data, the method comprising: for two adjacent operation stages of the plurality of operation stages which comprise a first operation stage and a second operation stage after the first operation stage: computing intermediate data for storage into an additional register of the second operation stage based on expansion data stored in an expansion register of the first operation stage; computing expansion data for storage into a 15th expansion register of the second operation stage based on intermediate data stored in an additional register of the first operation stage; and taking expansion data stored in an ith expansion register of the first operation stage as expansion data for storage into an (i−1)th expansion register of the second operation stage, where 1≤i≤15 and i is an integer.

Other features of the present disclosure and advantages thereof will become more apparent from the following detailed description of exemplary embodiments of the present disclosure with reference to the accompanying drawings.

BRIEF DESCRIPTION OF THE DRAWINGS

The accompanying drawings constituting a part of this specification, describe embodiments of the present disclosure and, together with the specification, serve to explain the principles of the present disclosure.

The present disclosure can be more clearly understood from the following detailed description with reference to the accompanying drawings, in which.

Figure 1:
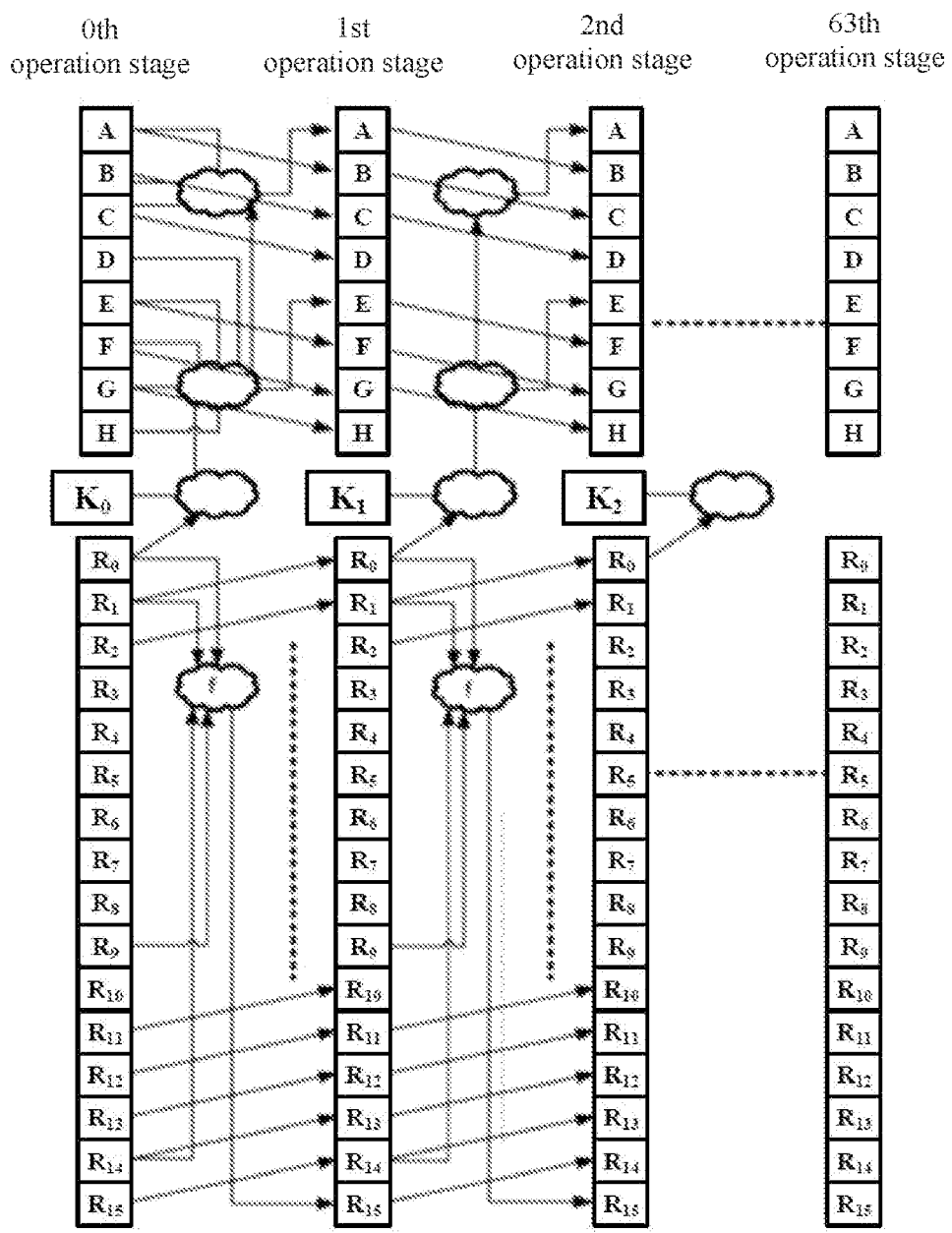
FIG. 1 shows a schematic diagram of an exemplary pipeline structure for performing a SHA-256 algorithm.

Note that in the embodiments described below, a same reference numeral is sometimes shared among different drawings to denote a same portion or portions having a same function, and a repetitive description thereof will be omitted. In this specification, similar reference numerals and letters are used to designate similar items, and therefore, once a certain item is defined in one drawing, further discussion thereof is not required in subsequent drawings.

For ease of understanding, positions, dimensions, ranges, etc. of structures shown in the drawings, etc., do not necessarily indicate actual positions, dimensions, ranges, etc. Therefore, the disclosed invention is not limited to the positions, dimensions, ranges, etc. disclosed in the drawings, etc. Further, the drawings are not necessarily drawn to scale, and some features may be enlarged to show details of specific components.

DETAILED DESCRIPTION

Various exemplary embodiments of the present disclosure will now be described in detail with reference to the accompanying drawings. It should be noted that relative arrangements, numerical expressions, and numerical values of components and steps set forth in these embodiments do not limit the scope of the present disclosure unless otherwise specified.

The following description of at least one exemplary embodiment is merely illustrative in nature and is in no way intended to limit this disclosure and its application or uses. Those skilled in the art will appreciate that they are merely illustrative of exemplary ways in which the present disclosure can be implemented, rather than exhaustive ways.

Techniques, methods, and devices known to one of ordinary skill in the related art may not be discussed in detail but should be regarded as part of the granted specification where appropriate.

To more clearly and intuitively present inventive concepts of the present disclosure, a SHA-256 algorithm will be briefly described hereinafter and taken as a representative example of a hash algorithm to describe a circuit for performing a hash algorithm and related method according to the embodiments of the present disclosure. Those skilled in the art will appreciate that the circuit for performing the hash algorithm and related method according to the embodiments of the present disclosure are applicable to any hash algorithm and can even further be applied in any other suitable circuit and method, and not limited to the implementation of the SHA-256 algorithm.

FIG. 1 shows a schematic diagram of an exemplary pipeline structure for performing a SHA-256 algorithm. Input to the SHA-256 is data $w_1$ th a maximum length less than $2^{64}$ bits, and output therefrom is a 256-bit data digest, i.e., hash value. The input data is processed in a 512-bit data block as a unit. To implement the SHA-256 algorithm, 64 rounds of repetitive operations are required to be performed for each 512-bit data block, and thus a parallel operation on 64 groups of data can be performed using a pipeline structure comprising 64 operation stages. As shown in FIG. 1, the pipeline structure comprises 0th to 63th operation stages, each operation stage comprising 8 32-bit compression registers A to H for storing intermediate values and 16 32-bit expansion registers $R_0$ to $R_{15}$ for storing expansion data. The 0th operation stage can receive an input data block, divide it into 8 blocks of 32-bit data and store them into the compression registers A to H respectively, and then perform operation processing on them and provide their results to the 1st operation stage. Then, each operation stage performs an operation on its received operation result from a preceding operation stage and provides its own operation result to a subsequent operation stage. Finally, after operations of the 64 operation stages, an operation core can output a hash operation result of performing the SHA-256 algorithm once on the input data.

Internal logic of a round of operations performed by the SHA-256 on each operation stage will be discussed in detail below. A (t)th round of operations performed on a (t)th operation stage is defined by(t is an integer and satisfies $0 \leq t \leq 63$):

$T1 = H + \Sigma_1(E) + Ch(E, F, G) + K_t + W_t$;
$T2 = \Sigma_0(A) + Maj(A, B, C)$;
$H = G$;
$G = F$;
$F = E$;
$E = D + T1$;
$D = C$;
$C = B$;
$B = A$;

$$A = T1 + T2; \quad \text{(operation expression 1)}$$

wherein:
$Ch(x, y, z) = (x \text{ AND } y) \oplus ((\text{NOT } x) \text{ AND } z)$
$Maj(x, y, z) = (x \text{ AND } y) \oplus (x \text{ AND } z) \oplus (y \text{ AND } z)$
$\Sigma_0(x) = ROTR^2(x) \oplus ROTR^{13}(x) \oplus ROTR^{22}(x)$
$\Sigma_1(x) = ROTR^6(x) \oplus ROTR^{11}(x) \oplus ROTR^{25}(x)$ wherein $ROTR^n(x)$ denotes that a 32-bit variable x is rotated n bits to the right; $W_t$ is a 32-bit word derived from the current 256-bit input data block; $K_t$ is a 32-bit additional constant; + is modulo $2^{32}$ addition; AND is a 32-bit bitwise AND operation; NOT is an operation of negation; and $\oplus$ is an exclusive OR operation.

Next, how the 32-bit word $W_t$ is derived from the 512-bit data block will be described. $W_t$ can be obtained according to the following operation expression:
for $0 \leq t \leq 15$: $W_t$ is taken directly from the input data block;
for $16 \leq t \leq 63$:

$$W_t = \sigma_1(W_{t-2}) + W_{t-7} + \sigma_0(W_{t-15}) + W_{t-16} \quad \text{(operation expression 2)}$$

wherein:
$\sigma_0(x) = ROTR^7(x) \oplus ROTR^{18}(x) \oplus SHR^3(x)$
$\sigma_1(x) = ROTR^{17}(x) \oplus ROTR^{19}(x) \oplus SHR^{10}(x)$ wherein $ROTR^n(x)$ denotes that a 32-bit variable x is rotated n bits to the right; $SHR^n(x)$ denotes that a 32-bit variable x is shifted n bits to the right with the left thereof padded by 0; $\oplus$ is an exclusive OR operation; + is modulo $2^{32}$ addition.

Note that, formulas of the above functions $\Sigma_0(x)$, $\Sigma_1(x)$, $\sigma_0(x)$, $\sigma_1(x)$ are specific forms for processing 32-bit data given by taking the SHA-256 as an example, and those skilled in the art know that in other SHA algorithms (e.g., SHA-512, etc.) and even other hash algorithms, these functions can adaptively take other corresponding forms for processing other sizes of data (e.g., 64-bit data, etc.).

Figure 2:
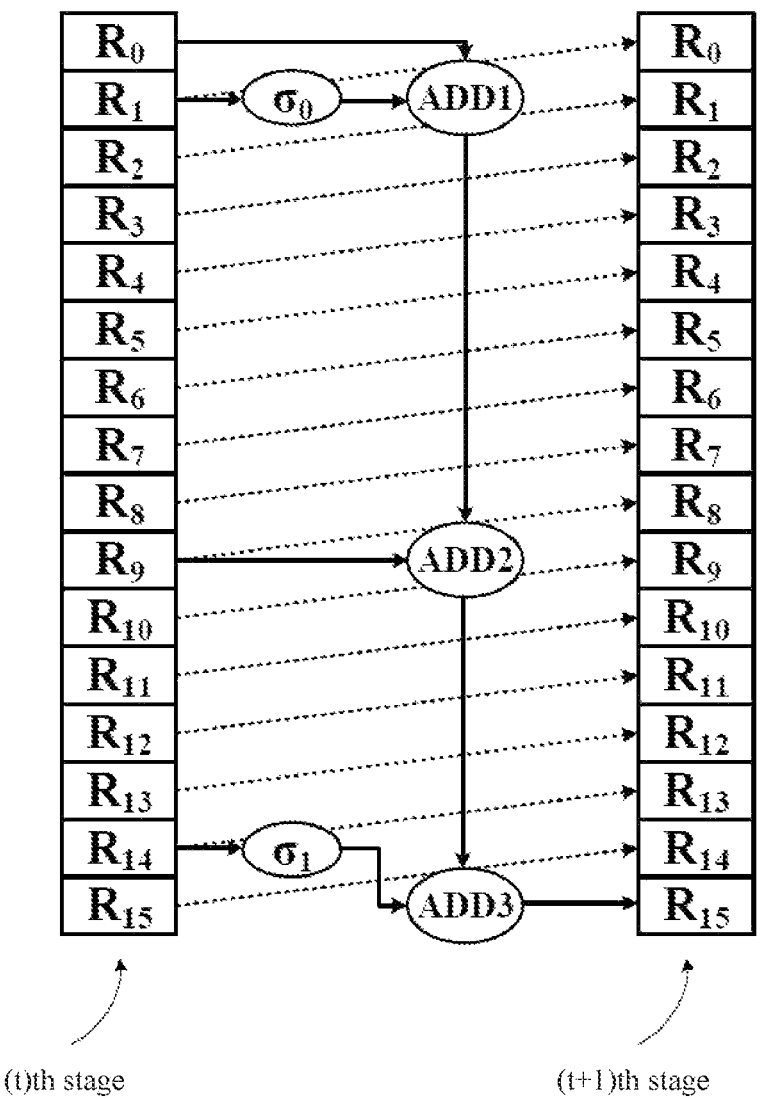
FIG. 2 schematically shows conventional operation logic between expansion data in expansion registers of two adjacent operation stages in the pipeline structure of FIG. 1.

Specifically, FIG. 2 shows conventional operation logic between expansion data in expansion registers of two adjacent operation stages in the pipeline structure in FIG. 1. Expansion data to be stored in an expansion register $R_{15}$ of a subsequent operation stage needs to be computed using expansion data in expansion registers $R_0$, $R_1$, $R_9$, and $R_{14}$ of each operation stage, and in addition, expansion data in expansion registers $R_1$ to $R_{15}$ can be directly shifted into corresponding expansion registers $R_0$ to $R_{14}$ of the subsequent operation stage. Specifically, expansion data $w_{15}'$ in an expansion register $R_{15}$ of a (t+1)th operation stage is obtained by sequentially adding, through three adders ADD1, ADD2 and ADD3, expansion data $w_0$ in an expansion register $R_0$ of the (t)th operation stage, $\sigma_0(w_1)$ obtained from performing a $\sigma_0$ operation on expansion data in an expansion register $R_{10}$ f the (t)th operation stage by a $\sigma_0$ operator, expansion data $w_9$ in an expansion register $R_9$ of the (t)th operation stage, and $\sigma_1(w_{14})$ obtained from performing a $\sigma_1$ operation on expansion data in an expansion register $R_{14}$ of the (t)th operation stage by a $\sigma_1$ operator, that is, $w_{15}' = w_0 + \sigma_0(w_1) + w_9 + \sigma_1(w_{14})$. It can be seen that the computation of the expansion data $w_{15}'$ to be stored in the expansion register $R_{15}$ of the subsequent operation stage from the expansion data $w_0$, $w_1$, $w_9$, $w_{14}$ in the expansion registers $R_0$, $R_1$, $R_9$, $R_{14}$ of the (t)th operation stage needs to experience up to 4 operation logic stages, which brings significant computation latency, limits operation speed of the pipeline structure, and further makes it difficult to achieve a lower ratio of power consumption to hash rate.

In this regard, inventors of the present application have noted that there is a direct connection between an expansion register $R_0$ of the (t+1)th operation stage and an expansion register $R_{10}$ f the (t)th operation stage, that is, expansion data stored in the expansion register $R_1$ of the (t)th operation stage is directly shifted into the expansion register $R_0$ of the (t+1)th operation stage. Therefore, the inventors of the present application conceived that, by using this direct connection of the expansion registers $R_0$, $R_1$, a portion involving the expansion data in the expansion register $R_0$ of the (t+1)th operation stage (i.e., the expansion data in the expansion register $R_{10}$ f the (t)th operation stage) in a process for computing expansion data to be stored in an expansion register $R_{15}$ of a (t+2)th operation stage is advanced to be performed simultaneously with a process for computing the expansion data to be stored in the expansion register $R_{15}$ of the (t+1)th operation stage, and is stored in the expansion register $R_0$ of the (t+1)th operation stage. In this way, after the process for computing the expansion data to be stored in the expansion register $R_{15}$ of the (t+2)th operation stage is disassembled, a disassembled portion can be processed in parallel with the process for computing the expansion data to be stored in the expansion register $R_{15}$ of the (t+1)th operation stage. By means of the parallel processing, the number of operation logic stages that is required to be experienced for computing expansion data in each round of operations can be reduced.

Accordingly, the present disclosure provides a circuit for performing a hash algorithm with an improved expansion data operation logic module and an improved method of computing expansion data in the circuit for performing the hash algorithm, which can reduce the number of operation logic stages that is required to be experienced for computing, between adjacent operation stages, expansion data of a subsequent operation stage based on expansion data of a preceding operation stage, and significantly improves the operation speed of the circuit and thus of a computing chip including the circuit, thereby helping to achieve a lower ratio of power consumption to hash rate.

Figure 3:
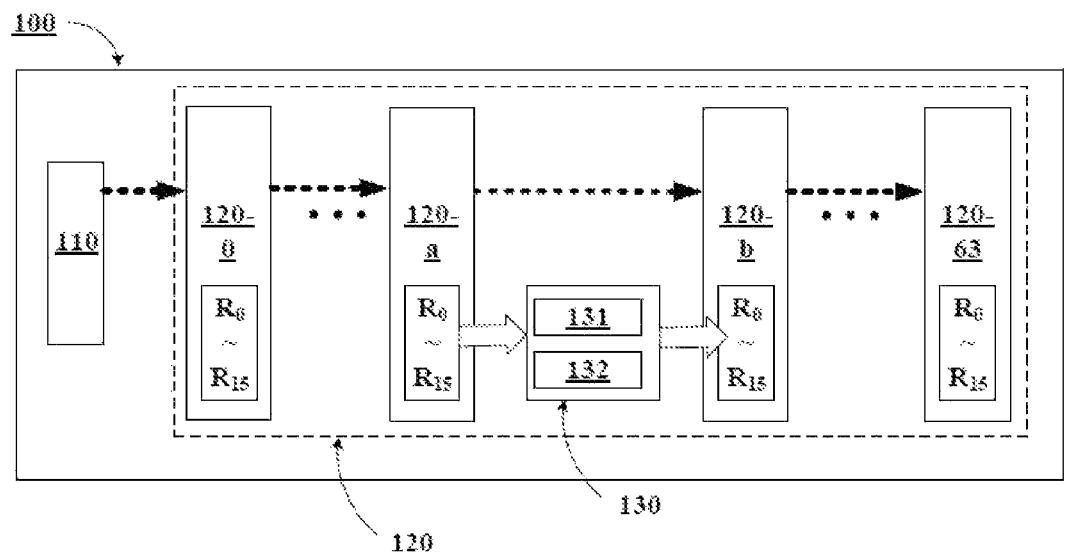
FIG. 3 shows a schematic block diagram of a circuit for performing a hash algorithm according to some embodiments of the present disclosure.

FIG. 3 shows a schematic block diagram of a circuit 100 for performing a hash algorithm according to some embodiments of the present disclosure, wherein arrows indicate a data transfer direction. The circuit 100 can comprise an input module 110 and an operation module 120. The input module 110 can be configured to receive data. The operation module 120 can be configured to compute a hash value based on the received data. The operation module 120 can comprise a plurality of operation stages 120-0, . . . , 120-63 arranged in a pipeline structure, each operation stage can comprise 0th to 15th expansion registers $R_0$ to $R_{15}$, and each expansion register can be configured to store expansion data of the current operation stage.

It should be understood that although the operation module 120 is depicted in the drawings as comprising 64 operation stages, as mentioned earlier, the circuit for performing the SHA-256 algorithm is taken herein merely as a non-limiting example, the circuit according to the present disclosure can actually be suitable for performing any hash algorithm (not limited to the SHA series of algorithms) now known or later developed for use in a mining machine and can comprise any suitable number of operation stages. It should also be understood that an actual circuit can also have additional other components (such as compression registers, etc.), but these other components are not shown in the drawings and are not discussed herein to avoid obscuring the main points of the present disclosure.

In general, expansion data stored in 0th to 15th expansion registers $R_0$ to $R_{15}$ of a most preceding operation stage 120-0 of the operation module 120 can be directly taken from data received by the input module 110, for example, while expansion data to be stored in 0th to 15th expansion registers $R_0$ to $R_{15}$ of each operation stage starting from the operation stage 120-1 can be determined based on expansion data stored in 0th to 15th expansion registers $R_0$ to $R_{15}$ of a preceding operation stage, for example. What is mainly discussed in the present disclosure is how to determine expansion data to be stored in 0th to 15th expansion registers $R_0$ to $R_{15}$ of a subsequent operation stage based on expansion data stored in 0th to 15th expansion registers $R_0$ to $R_{15}$ of a preceding operation stage.

The operation module 120 can further comprise a plurality of expansion data operation logic modules 130, each expansion data operation logic module 130 being disposed between two respective adjacent operation stages of the plurality of operation stages 120-0, . . . , 120-63 of the operation module 120. Herein, a preceding operation stage of the two adjacent operation stages can be referred to as a first operation stage and a subsequent operation stage of the two adjacent operation stages can be referred to as a second operation stage, and it is noted that "first" and "second" are merely for distinction rather than limitation. For example, as shown in FIG. 3, an expansion data operation logic module 130 is disposed between two adjacent operation stages 120-a, 120-b. Each expansion data operation logic module 130 can comprise a first sub-module 131 and a second sub-module 132.

The expansion data operation logic module 130 can be configured to compute expansion data for storage into an expansion register of the second operation stage (e.g., 120-b) based on expansion data stored in an expansion register of the first operation stage (e.g., 120-a). The first sub-module 131 can be configured to compute expansion data for storage into a 0th expansion register $R_0$ of the second operation stage based on expansion data stored in a 1st expansion register $R_{10}$ f the first operation stage. The second sub-module 132 can be configured to compute expansion data for storage into a 15th expansion register $R_{15}$ of the second operation stage based on expansion data stored in a 0th expansion register $R_0$ of the first operation stage. In addition, expansion data for storage into an (i−1)th expansion register of the second operation stage can be expansion data stored in an ith expansion register of the first operation stage, where $2 \leq i \leq 15$ and i is an integer. That is, in the circuit 100, expansion data to be stored in the 0th expansion register $R_0$ and the 15th expansion register $R_{15}$ of the second operation stage is obtained by performing operations on expansion data stored in expansion registers of the first operation stage, and expansion data to be stored in 1st to 14th expansion registers $R_1$ to $R_{14}$ of the second operation stage is obtained by directly shifting expansion data stored in each expansion register of 2nd to 15th expansion registers $R_2$ to $R_{15}$ of the first operation stage into corresponding expansion registers of the 1st to 14th expansion registers $R_1$ to $R_{14}$ of the second operation stage.

In some embodiments, expansion data stored in a 15th expansion register $R_{15}$ of a subsequent operation stage of the second operation stage can be determined based on expansion data stored in a 1st expansion register $R_1$, a 2nd expansion register $R_2$, a 10th expansion register $R_{10}$, and a 15th expansion register $R_{15}$ of the first operation stage. In some embodiments, expansion data $w_{15}''$ stored in the 15th expansion register $R_{15}$ of the subsequent operation stage of the second operation stage, expansion data $w_1$ stored in the 1st expansion register $R_{10}$ f the first operation stage, expansion data $w_2$ stored in the 2nd expansion register $R_2$ of the first operation stage, expansion data $w_{10}$ stored in the 10th expansion register $R_{10}$ of the first operation stage, and expansion data $w_{15}$ stored in the 15th expansion register $R_{15}$ of the first operation stage can satisfy the following relation: $w_{15}''=w_1+\sigma_0(w_2)+w_{10}+\sigma_1(w_{15})$, where $\sigma_0$, $\sigma_1$ and + are defined as the above.

In some embodiments, the first sub-module 131 can be configured to compute expansion data for storage into a 0th expansion register $R_0$ of the second operation stage based on expansion data stored in one or two of a 2nd expansion register $R_2$, a 10th expansion register $R_{10}$, a 15th expansion register $R_{15}$ of the first operation stage and expansion data stored in a 1st expansion register $R_{10}$ f the first operation stage.

In some embodiments, the second sub-module 132 can be configured to compute expansion data for storage into a 15th expansion register $R_{15}$ of the second operation stage based on expansion data stored in one or two of a 1st expansion register $R_1$, a 9th expansion register $R_9$, a 14th expansion register $R_{14}$ of the first operation stage and expansion data stored in a 0th expansion register $R_0$ of the first operation stage.

Several non-limiting exemplary configurations of a portion, comprising the expansion data operation logic module, in the circuit shown in FIG. 3 according to embodiments of the present disclosure will be described below in conjunction with FIGS. 4 to 7. In these figures, the two adjacent operation stages 120-a and 120-b are taken as examples for explanation, and it can be understood that any two adjacent operation stages in the operation module 120 can be the operation stages 120-a and 120-b discussed below. In addition, in these figures, for the sake of clarity, the first sub-module 131 and the second sub-module 132 are indicated by dashed boxes, moving directions of expansion data that is directly shifted with no operation are indicated by dotted arrows, moving directions of expansion data processed via the first sub-module 131 are indicated by chain-dotted arrows, and moving directions of expansion data processed via the second sub-module 132 are indicated by solid arrows.

In some embodiments, the first sub-module 131 can be configured to compute expansion data for storage into a 0th expansion register $R_0$ of the second operation stage based on expansion data stored in a 1st expansion register $R_1$ and a 2nd expansion register $R_2$ of the first operation stage, and the second sub-module 132 can be configured to compute expansion data for storage into a 15th expansion register $R_{15}$ of the second operation stage based on expansion data stored in a 0th expansion register $R_0$, a 9th expansion register $R_9$, and a 14th expansion register $R_{14}$ of the first operation stage.

Figure 4:
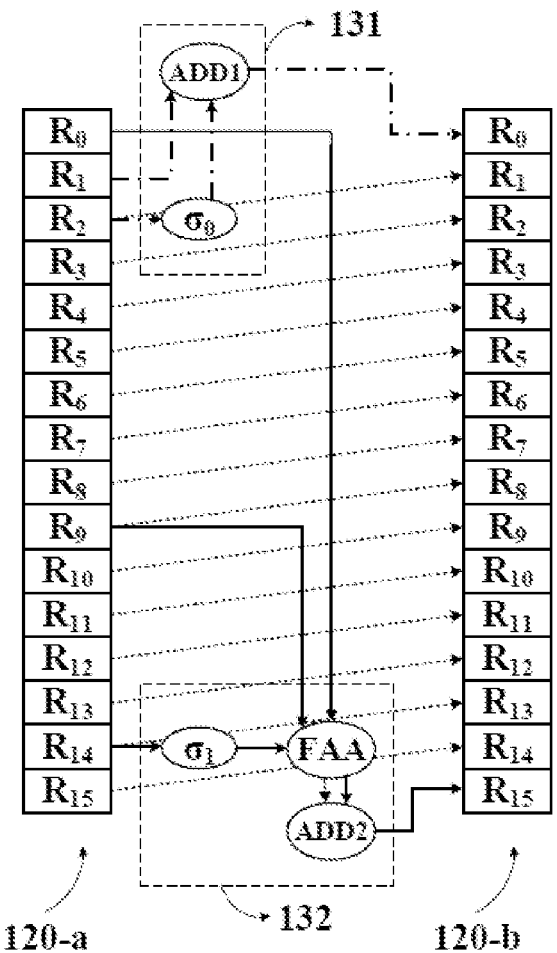
FIGS. 4 to 7 schematically show exemplary configurations of a portion, comprising an expansion data operation logic module, in the circuit as shown in FIG. 3 according to embodiments of the present disclosure.

For example, in some examples, as shown in FIG. 4, expansion data $w_0'$ in a 0th expansion register $R_0$ of the operation stage 120-b is obtained by processing, by the first sub-module 131, expansion data $w_1$ stored in a 1st expansion register $R_1$ and expansion data $w_2$ stored in a 2nd expansion register $R_2$ of the operation stage 120-a. Specifically, in this example, the first sub-module 131 comprises a $\sigma_0$ operator for performing a $\sigma_0$ operation and an adder ADD1 for performing an addition operation, wherein the expansion data $w_2$ is input to the $\sigma_0$ operator, output of the $\sigma_0$ operator and the expansion data $w_1$ are input to the adder ADD1, and output of the adder ADD1 is provided to the 0th expansion register $R_0$ of the operation stage 120-b, so that $w_0'=w_1+\sigma_0(w_2)$.

As further shown in FIG. 4, expansion data $w_{15}'$ in a 15th expansion register $R_{15}$ of the operation stage 120-b is obtained by processing, by the second sub-module 132, expansion data $w_0$ stored in a 0th expansion register $R_0$, expansion data $w_9$ stored in a 9th expansion register $R_9$, and expansion data $w_{14}$ stored in a 14th expansion register $R_{14}$ of the operation stage 120-a. Specifically, in this example, the second sub-module 132 comprises a $\sigma_1$ operator for performing a $\sigma_1$ operation, and a full-adder FAA and an adder ADD2 for performing an addition operation, wherein the expansion data $w_{14}$ is input to the $\sigma_1$ operator, output of the $\sigma_1$ operator, the expansion data $w_0$, and the expansion data $w_9$ are input to the full-adder FAA, outputs of the full-adder FAA are input to the adder ADD2, and output of the adder ADD2 is provided to the 15th expansion register $R_{15}$ of the operation stage 120-b, so that $w_{15}'=w_0+w_9+\sigma_1(w_{14})$.

As further shown in FIG. 4, expansion data stored in an ith expansion register of the operation stage 120-a is directly shifted into an (i−1)th expansion register of the operation stage 120-b, where 2≤i≤15 and i is an integer.

In the example shown in FIG. 4, the number of operation logic stages experienced by the first sub-module 131 is 2, and the number of operation logic stages experienced by the second sub-module 132 is 3. The first sub-module 131 and the second sub-module 132 can be operated in parallel independently of each other, so that the number of operation logic stages that is required to be experienced in computing the expansion data for the operation stage 120-b is finally reduced to 3, and the computation latency is greatly reduced, which makes the operation speed of the pipeline structure significantly improved.

In some embodiments, the first sub-module 131 can be configured to compute expansion data for storage into a 0th expansion register $R_0$ of the second operation stage based on expansion data stored in a 1st expansion register $R_1$ and a 10th expansion register $R_{10}$ of the first operation stage, and the second sub-module 132 can be configured to compute expansion data for storage into a 15th expansion register $R_{15}$ of the second operation stage based on expansion data stored in a 0th expansion register $R_0$, a 1st expansion register $R_1$, and a 14th expansion register $R_{14}$ of the first operation stage.

Figure 5:
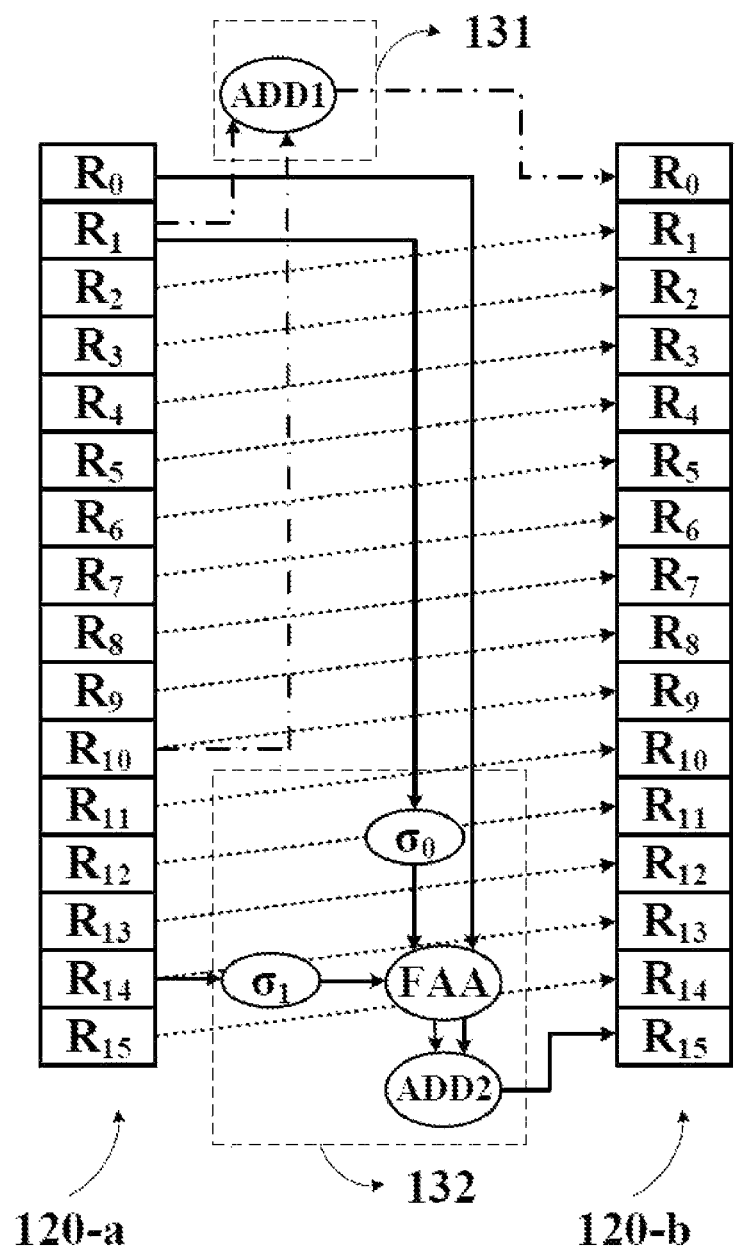

For example, in some examples, as shown in FIG. 5, expansion data $w_0'$ in a 0th expansion register $R_0$ of the operation stage 120-b is obtained by processing, by the first sub-module 131, expansion data $w_1$ stored in a 1st expansion register $R_1$ and expansion data $w_{10}$ stored in a 10th expansion register $R_{10}$ of the operation stage 120-a. Specifically, in this example, the first sub-module 131 comprises an adder ADD1 for performing an addition operation, wherein the expansion data $w_1$ and the expansion data $w_{10}$ are input to the adder ADD1, and output of the adder ADD1 is provided to the 0th expansion register $R_0$ of the operation stage 120-b, so that $w_0'=w_1+w_{10}$.

As further shown in FIG. 5, expansion data $w_{15}'$ in a 15th expansion register $R_{15}$ of the operation stage 120-b is obtained by processing, by the second sub-module 132, expansion data $w_0$ stored in a 0th expansion register $R_0$, expansion data $w_1$ stored in a 1st expansion register $R_1$, and expansion data $w_{14}$ stored in a 14th expansion register $R_{14}$ of the operation stage 120-a. Specifically, in this example, the second sub-module 132 comprises a $\sigma_0$ operator for performing a $\sigma_0$ operation, a $\sigma_1$ operator for performing a $\sigma_1$ operation, and a full-adder FAA and an adder ADD2 for performing an addition operation, wherein the expansion data $w_1$ is input to the $\sigma_0$ operator, the expansion data $w_{14}$ is input to the $\sigma_1$ operator, and the $\sigma_0$ operation and the $\sigma_1$ operation can be performed simultaneously, for example. Then, output of the $\sigma_0$ operator, output of the $\sigma_1$ operator, and the expansion data $w_0$ are input to the full-adder FAA, outputs of the full-adder FAA are input to the adder ADD2, and output of the adder ADD2 is provided to the 15th expansion register $R_{15}$ of the operation stage 120-b, so that $w_{15}'=w_0+\sigma_0(w_1)+\sigma_1(w_{14})$.

As further shown in FIG. 5, expansion data stored in an ith expansion register of the operation stage 120-a is directly shifted into an (i−1)th expansion register of the operation stage 120-b, where 2≤i≤15 and i is an integer.

In the example shown in FIG. 5, the number of operation logic stages experienced by the first sub-module 131 is 1, and the number of operation logic stages experienced by the second sub-module 132 is 3. The first sub-module 131 and the second sub-module 132 can be operated in parallel independently of each other, so that the number of operation logic stages that is required to be experienced in computing the expansion data for the operation stage 120-b is finally reduced to 3, and the computation latency is greatly reduced, which makes the operation speed of the pipeline structure significantly improved.

In some embodiments, the first sub-module 131 can be configured to compute expansion data for storage into a 0th expansion register $R_0$ of the second operation stage based on expansion data stored in a 1st expansion register $R_1$, a 2nd expansion register $R_2$, and a 10th expansion register $R_{10}$ of the first operation stage, and the second sub-module 132 can be configured to compute expansion data for storage into a 15th expansion register $R_{15}$ of the second operation stage based on expansion data stored in a 0th expansion register $R_0$ and a 14th expansion register $R_{14}$ of the first operation stage.

Figure 6:
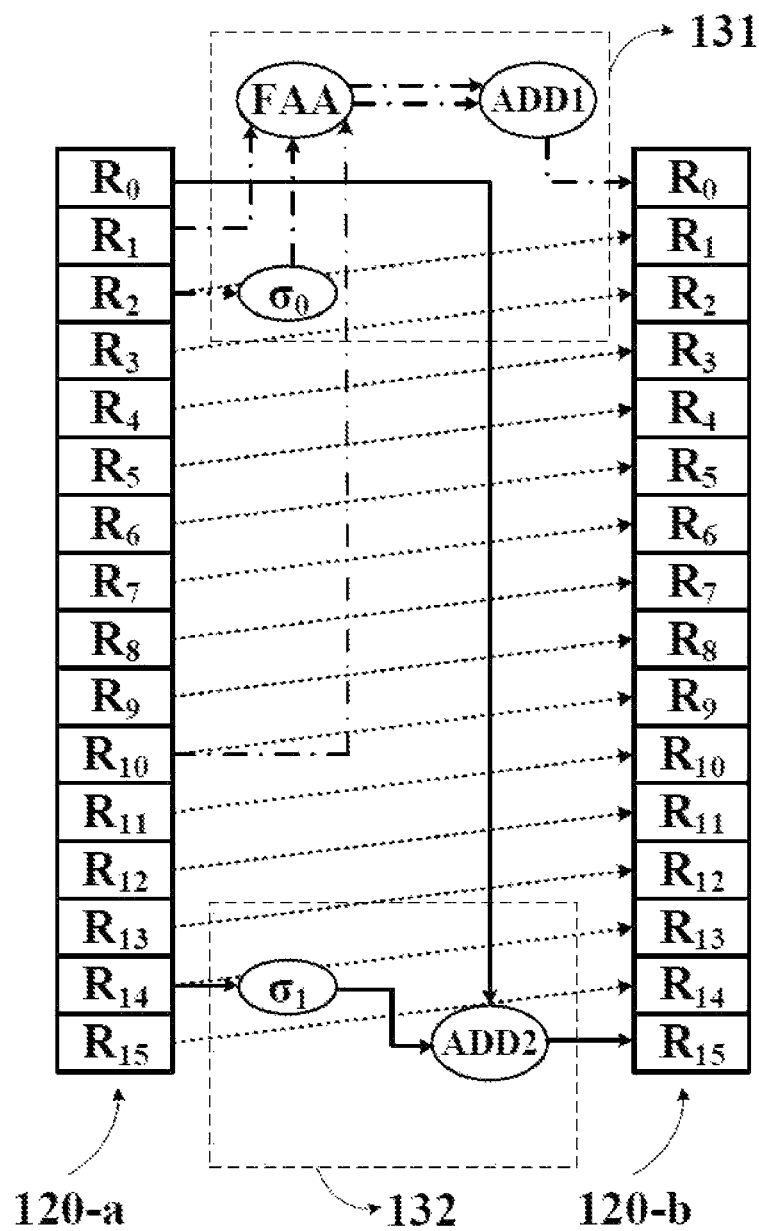

For example, in some examples, as shown in FIG. 6, expansion data $w_0'$ in a 0th expansion register $R_0$ of the operation stage 120-b is obtained by processing, by the first sub-module 131, expansion data $w_1$ stored in a 1st expansion register $R_1$, expansion data $w_2$ stored in a 2nd expansion register $R_2$, and expansion data $w_{10}$ stored in a 10th expansion register $R_{10}$ of the operation stage 120-a. Specifically, in this example, the first sub-module 131 comprises a $\sigma_0$ operator for performing a $\sigma_0$ operation, and a full-adder FAA and an adder ADD1 for performing an addition operation, wherein the expansion data $w_2$ is input to the $\sigma_0$ operator, output of the $\sigma_0$ operator, the expansion data $w_1$, and the expansion data $w_{10}$ are input to the full-adder FAA, outputs of the full-adder FAA are input to the adder ADD1, and output of the adder ADD1 is provided to the 0th expansion register $R_0$ of the operation stage 120-b, so that $w_0'=w_1+\sigma_0(w_2)+w_{10}$.

As further shown in FIG. 6, expansion data $w_{15}'$ in a 15th expansion register $R_{15}$ of the operation stage 120-b is obtained by processing, by the second sub-module 132, expansion data $w_0$ stored in a 0th expansion register $R_0$ and expansion data $w_{14}$ stored in a 14th expansion register $R_{14}$ of the operation stage 120-a. Specifically, in this example, the second sub-module 132 comprises a $\sigma_1$ operator for performing a $\sigma_1$ operation and an adder ADD2 for performing an addition operation, wherein the expansion data $w_{14}$ is input to the $\sigma_1$ operator, output of the $\sigma_1$ operator and the expansion data $w_0$ are input to the adder ADD2, and output of the adder ADD2 is provided to the 15th expansion register $R_{15}$ of the operation stage 120-b, so that $w_{15}'=w_0+\sigma_1(w_{14})$.

As further shown in FIG. 6, expansion data stored in an ith expansion register of the operation stage 120-a is directly shifted into an (i−1)th expansion register of the operation stage 120-b, where $2 \leq i \leq 15$ and i is an integer.

In the example shown in FIG. 6, the number of operation logic stages experienced by the first sub-module 131 is 3, and the number of operation logic stages experienced by the second sub-module 132 is 2. The first sub-module 131 and the second sub-module 132 can be operated in parallel independently of each other, so that the number of operation logic stages that is required to be experienced in computing the expansion data for the operation stage 120-b is finally reduced to 3, and the computation latency is greatly reduced, which makes the operation speed of the pipeline structure significantly improved.

In some embodiments, the first sub-module 131 can be configured to compute expansion data for storage into a 0th expansion register $R_0$ of the second operation stage based on expansion data stored in a 1st expansion register $R_1$ and a 15th expansion register $R_{15}$ of the first operation stage, and the second sub-module 132 can be configured to compute expansion data for storage into a 15th expansion register $R_{15}$ of the second operation stage based on expansion data stored in a 0th expansion register $R_0$, a 1st expansion register $R_1$, and a 9th expansion register $R_9$ of the first operation stage.

Figure 7:
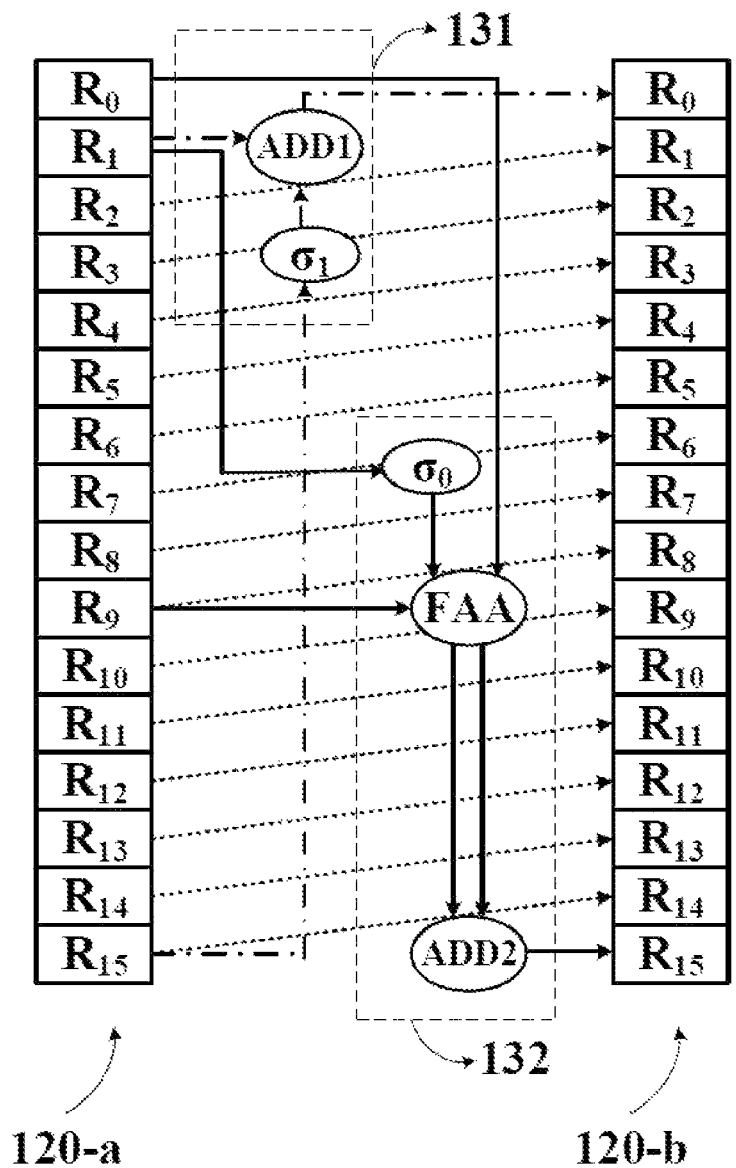

For example, in some examples, as shown in FIG. 7, expansion data $w_0'$ in a 0th expansion register $R_0$ of the operation stage 120-b is obtained by processing, by the first sub-module 131, expansion data $w_1$ stored in a 1st expansion register $R_1$ and expansion data $w_{15}$ stored in a 15th expansion register $R_{15}$ of the operation stage 120-a. Specifically, in this example, the first sub-module 131 comprises a $\sigma_1$ operator for performing a $\sigma_1$ operation and an adder ADD1 for performing an addition operation, wherein the expansion data $w_{15}$ is input to the $\sigma_1$ operator, output of the $\sigma_1$ operator and the expansion data $w_1$ are input to the adder ADD1, and output of the adder ADD1 is provided to the 0th expansion register $R_0$ of the operation stage 120-b, so that $w_0'=w_1+\delta_1(w_{15})$.

As further shown in FIG. 7, expansion data $w_{15}'$ in a 15th expansion register $R_{15}$ of the operation stage 120-b is obtained by processing, by the second sub-module 132, expansion data $w_0$ stored in a 0th expansion register $R_0$, expansion data $w_1$ stored in a 1st expansion register $R_1$, and expansion data $w_9$ stored in a 9th expansion register $R_9$ of the operation stage 120-a. Specifically, in this example, the second sub-module 132 comprises a $\sigma_0$ operator for performing a $\sigma_0$ operation, and a full-adder FAA and an adder ADD2 for performing an addition operation, wherein the expansion data $w_1$ is input to the $\sigma_0$ operator, output of the $\sigma_0$ operator, the expansion data $w_0$, and the expansion data $w_9$ are input to the full-adder FAA, outputs of the full-adder FAA are input to the adder ADD2, and output of the adder ADD2 is provided to the 15th expansion register $R_{15}$ of the operation stage 120-b, so that $w_{15}'=w_0+\sigma_0(w_1)+w_9$.

As further shown in FIG. 7, expansion data stored in an ith expansion register of the operation stage 120-a is directly shifted into an (i−1)th expansion register of the operation stage 120-b, where $2 \leq i \leq 15$ and i is an integer.

In the example shown in FIG. 7, the number of operation logic stages experienced by the first sub-module 131 is 2, and the number of operation logic stages experienced by the second sub-module 132 is 3. The first sub-module 131 and the second sub-module 132 can be operated in parallel independently of each other, so that the number of operation logic stages that is required to be experienced in computing the expansion data for the operation stage 120-b is finally reduced to 3, and the computation latency is greatly reduced, which makes the operation speed of the pipeline structure significantly improved.

In some embodiments, the first sub-module 131 can be configured to compute expansion data for storage into a 0th expansion register $R_0$ of the second operation stage based on expansion data stored in a 1st expansion register $R_1$, a 2nd expansion register $R_2$, and a 15th expansion register $R_{15}$ of the first operation stage, and the second sub-module 132 can be configured to compute expansion data for storage into a 15th expansion register $R_{15}$ of the second operation stage based on expansion data stored in a 0th expansion register $R_0$ and a 9th expansion register $R_9$ of the first operation stage. Specifically, in some examples, expansion data $w_0'$ in a 0th expansion register $R_0$ of the operation stage 120-b can be obtained by processing, by the first sub-module 131, expansion data $w_1$ stored in a 1st expansion register $R_1$, expansion data $w_2$ stored in a 2nd expansion register $R_2$, and expansion data $w_{15}$ stored in a 15th expansion register $R_{15}$ of the operation stage 120-a, and expansion data $w_{15}'$ in a 15th expansion register $R_{15}$ of the operation stage 120-b can be obtained by processing, by the second sub-module 132, expansion data $w_0$ stored in a 0th expansion register $R_0$ and expansion data $w_9$ stored in a 9th expansion register $R_9$ of the operation stage 120-a, so that $w_0'=w_1+\sigma_0(w_2)+\sigma_1(w_{15})$, $w_{15}'=w_0+w_9$.

In some embodiments, the first sub-module 131 can be configured to compute expansion data for storage into a 0th expansion register $R_0$ of the second operation stage based on expansion data stored in a 1st expansion register $R_1$, a 10th expansion register $R_{10}$, and a 15th expansion register $R_{15}$ of the first operation stage, and the second sub-module 132 can be configured to compute expansion data for storage into a 15th expansion register of the second operation stage based on expansion data stored in a 0th expansion register $R_0$ and a 1st expansion register $R_1$ of the first operation stage. Specifically, in some examples, expansion data $w_0'$ in a 0th expansion register $R_0$ of the operation stage 120-b can be obtained by processing, by the first sub-module 131, expansion data $w_1$ stored in a 1st expansion register $R_1$, expansion data $w_{10}$ stored in a 10th expansion register $R_{10}$, and expansion data $w_{15}$ stored in a 15th expansion register $R_{15}$ of the operation stage 120-$a$, and expansion data $w_{15}'$ in a 15th expansion register $R_{15}$ of the operation stage 120-$b$ can be obtained by processing, by the second sub-module 132, expansion data $w_0$ stored in a 0th expansion register $R_0$ and expansion data $w_1$ stored in a 1st expansion register $R_1$ of the operation stage 120-$a$, so that $w_0'=w_1+w_{10}+\sigma_1(w_{15})$, $w_{15}'=w_0+\sigma_0(w_1)$.

Figure 15:
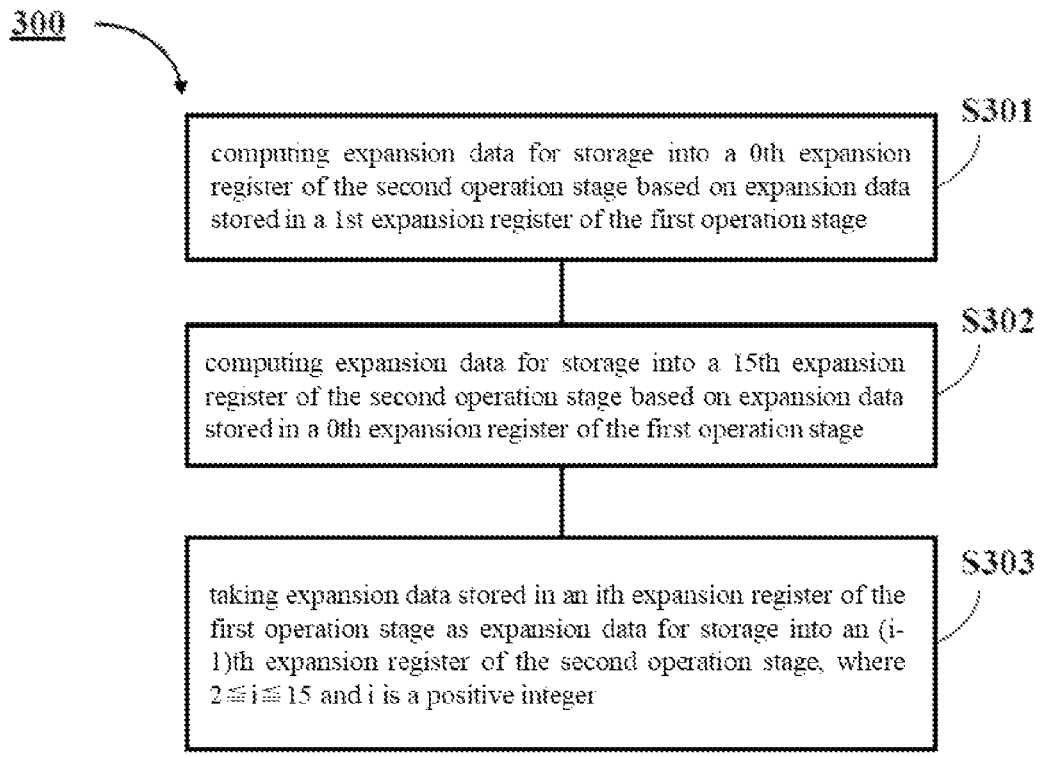
FIGS. 15 and 16 show exemplary flow diagrams of a method for computing expansion data according to embodiments of the present disclosure.

Accordingly, the present disclosure also provides a method of computing expansion data in a circuit for performing a hash algorithm. FIG. 15 shows an exemplary flow diagram of a method 300 of computing expansion data in a circuit for performing a hash algorithm according to embodiments of the present disclosure. Such a circuit can comprise an input module configured to receive data and an operation module configured to compute a hash value based on the received data, wherein the operation module can comprise a plurality of operation stages arranged in a pipeline structure, each operation stages can comprise 0th to 15th expansion registers, each expansion register can be configured to store expansion data of the current operation stage. For two adjacent operation stages of the plurality of operation stages of the operation module which comprise a first operation stage and a second operation stage after the first operation stage, the method 300 can comprise: at S301, computing expansion data for storage into a 0th expansion register of the second operation stage based on expansion data stored in a 1st expansion register of the first operation stage; at S302, computing expansion data for storage into a 15th expansion register of the second operation stage based on expansion data stored in a 0th expansion register of the first operation stage; and at S303, taking expansion data stored in an ith expansion register of the first operation stage as expansion data for storage into an (i-1)th expansion register of the second operation stage, where 2≤i≤15 and i is an integer. Note that S301 to S303 do not need to be performed in sequential order, but can be performed in any order, or can be performed at least partially in parallel.

In some embodiments, the computation of the expansion data for storage into the 0th expansion register of the second operation stage and the computation of the expansion data for storage into the 15th expansion register of the second operation stage can be performed simultaneously.

In some embodiments, expansion data stored in a 15th expansion register of a subsequent operation stage of the second operation stage can be determined based on expansion data stored in a 1st expansion register, a 2nd expansion register, a 10th expansion register, and a 15th expansion register of the first operation stage.

The method 300 can also compute expansion data in various ways as described above with respect to the first sub-module 131 and the second sub-module 132, which are not repeated herein. The method 300 can reduce the computation latency caused by computing expansion data in the circuit for performing the hash algorithm, thereby significantly improving the operation speed of the circuit and thus of a computing chip containing the circuit, thereby achieving a lower ratio of power consumption to hash rate.

Further, in the circuit and method according to the above embodiments of the present disclosure, an expansion register $R_0$ is used to store a portion involving expansion data in an expansion register $R_1$ of a preceding operation stage which was in a process originally for computing expansion data to be stored in an expansion register $R_{15}$ of a subsequent operation stage but is performed in advance. In some alternative embodiments, an additional register can also be used instead to implement the role of the expansion register $R_0$ in the above embodiments. Moreover, when the additional register is used, it can not only be used to perform the portion involving the expansion data in the expansion register $R_1$ of the preceding operation stage which was in the process originally for computing the expansion data to be stored in the expansion register $R_{15}$ of the subsequent operation stage in advance, but also can be used to perform any suitable portion which was in the process originally for computing the expansion data to be stored in the expansion register $R_{15}$ of the subsequent operation stage in advance.

Figure 8:
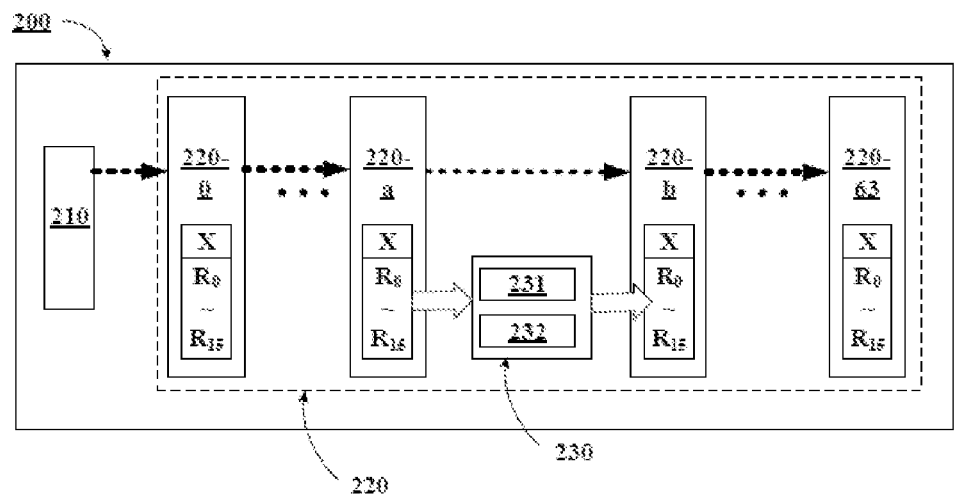
FIG. 8 shows a schematic block diagram of a circuit for performing a hash algorithm according to some embodiments of the present disclosure.

FIG. 8 shows a schematic block diagram of a circuit 200 for performing a hash algorithm according to some other embodiments of the present disclosure. Therein, arrows indicate a data transfer direction. The circuit 200 can comprise an input module 210 and an operation module 220. The input module 210 can be configured to receive data. The operation module 220 can be configured to compute a hash value based on the received data. The operation module 220 can comprise a plurality of operation stages 220-0, . . . , 220-63 arranged in a pipeline structure, each operation stage can comprise 0th to 15th expansion registers $R_0$ to $R_{15}$ and an additional register X, each expansion register can be configured to store expansion data of the current operation stage, and the additional register can be configured to store intermediate data for computing expansion data. In some embodiments, intermediate data stored in an additional register X of a most preceding operation stage 220-0 can be the same as expansion data stored in a 0th expansion register $R_0$ of the most preceding operation stage 220-0.

The operation module 220 can further comprise a plurality of expansion data operation logic modules 230, each expansion data operation logic module 230 being disposed between two respective adjacent operation stages of the plurality of operation stages 220-0, . . . , 220-63 of the operation module 220. Herein, a preceding operation stage in the two adjacent operation stages can be referred to as a first operation stage and a subsequent operation stage in the two adjacent operation stages can be referred to as a second operation stage, and it is noted that "first" and "second" are merely for distinction rather than limitation. For example, as shown in FIG. 8, an expansion data operation logic module 230 is disposed between two adjacent operation stages 220-$a$, 220-$b$. Each expansion data operation logic module 230 can comprise a first sub-module 231 and a second sub-module 232.

The expansion data operation logic module 230 can be configured to compute expansion data for storage into an expansion register of the second operation stage (e.g., 220-$b$) and intermediate data for storage into an additional register of the second operation stage based on expansion data stored in an expansion register of the first operation stage (e.g., 220-$a$) and intermediate data stored in an additional register of the first operation stage (e.g., 220-$a$). The first sub-module 231 can be configured to compute intermediate data for storage into an additional register of the second operation stage based on expansion data stored in an expansion register of the first operation stage. The second sub-module 232 can be configured to compute expansion data for storage into a 15th expansion register of the second operation stage based on intermediate data stored in an additional register of the first operation stage. In addition, expansion data for storage into an (i-1)th expansion register of the second operation stage can be expansion data stored in an ith expansion register of the first operation stage, where 1≤i≤15 and i is an integer. That is, in the circuit 200, expansion data to be stored in a 15th expansion register $R_{15}$ of the second operation stage is obtained by performing operations on intermediate data stored in an additional register of the first operation stage, and expansion data to be stored in 0th to 14th expansion registers $R_0$ to $R_{14}$ of the second operation stage is obtained by directly shifting expansion data stored in each expansion register of 1st to 15th expansion registers $R_1$ to $R_{15}$ of the first operation stage into corresponding expansion registers of the 0th to 14th expansion registers $R_0$ to $R_{14}$ of the second operation stage.

In some embodiments, expansion data stored in a 15th expansion register $R_{15}$ of a subsequent operation stage of the second operation stage can be determined based on expansion data stored in a 1st expansion register $R_1$, a 2nd expansion register $R_2$, a 10th expansion register $R_{10}$, and a 15th expansion register $R_{15}$ of the first operation stage. In some embodiments, expansion data $w_{15}''$ stored in the 15th expansion register $R_{15}$ of the subsequent operation stage of the second operation stage, expansion data $w_1$ stored in the 1st expansion register $R_1$ of the first operation stage, expansion data $w_2$ stored in the 2nd expansion register $R_2$ of the first operation stage, expansion data $w_{10}$ stored in the 10th expansion register $R_{10}$ of the first operation stage, and expansion data $w_{15}$ stored in the 15th expansion register $R_{15}$ of the first operation stage can satisfy the following relation: $w_{15}''=w_1+\sigma_0(w_2)+w_{10}+\sigma_1(w_{15})$, where $\sigma_0$, $\sigma_1$ and + are defined as the above.

In some embodiments, the first sub-module 231 can be configured to compute intermediate data for storage into an additional register X of the second operation stage based on expansion data stored in two or three of a 1st expansion register $R_1$, a 2nd expansion register $R_2$, a 10th expansion register $R_{10}$, and a 15th expansion register $R_{15}$ of the first operation stage.

In some embodiments, the second sub-module 232 can be configured to compute expansion data for storage into a 15th expansion register $R_{15}$ of the second operation stage based on expansion data stored in one or two of a 0th expansion register $R_0$, a 1st expansion register $R_1$, a 9th expansion register $R_9$, a 14th expansion register $R_{14}$ of the first operation stage and intermediate data stored in an additional register X of the first operation stage.

Several non-limiting exemplary configurations of a portion, comprising an expansion data operation logic module, in the circuit as shown in FIG. 8 according to embodiments of the present disclosure will be described below in conjunction with FIGS. 9 to 14. In these figures, two adjacent operation stages 220-a and 220-b are taken as examples for explanation, and it can be understood that any two adjacent operation stages in the operation module 220 can be the operation stages 220-a and 220-b discussed below. In addition, in these figures, for the sake of clarity, the first sub-module 231 and the second sub-module 232 are indicated by dashed boxes, moving directions of expansion data that is directly shifted with no operation are indicated by dotted arrows, moving directions of expansion data processed via the first sub-module 231 are indicated by chain-dotted arrows, and moving directions of expansion data processed via the second sub-module 232 are indicated by solid arrows.

In some embodiments, the first sub-module 231 can be configured to compute intermediate data for storage into an additional register X of the second operation stage based on expansion data stored in a 1st expansion register $R_1$ and a 2nd expansion register $R_2$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 9th expansion register $R_9$ and a 14th expansion register $R_{14}$ of the first operation stage.

Figure 9:
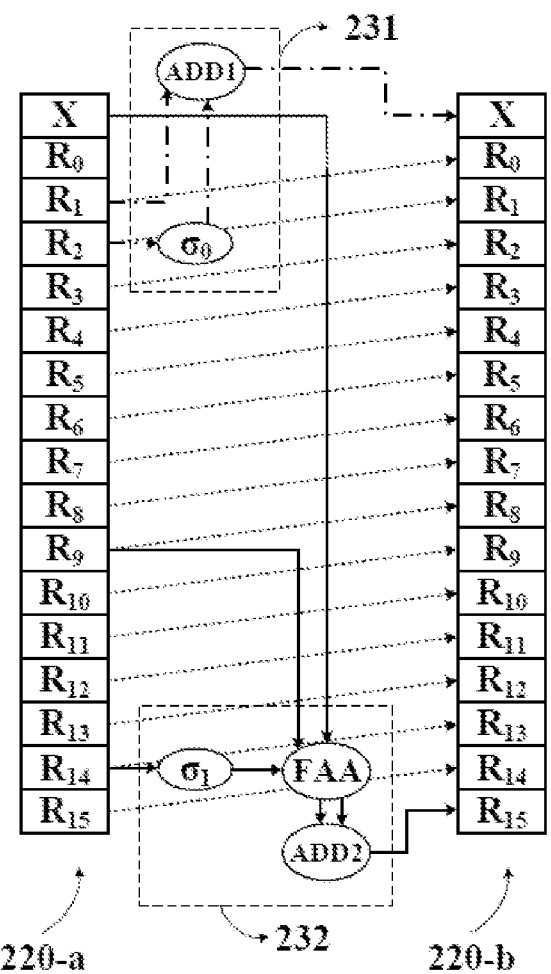
FIGS. 9 to 14 schematically show exemplary configurations of a portion, comprising an expansion data operation logic module, in the circuit as shown in FIG. 8 according to embodiments of the present disclosure.

For example, in some examples, as shown in FIG. 9, intermediate data $w_x'$ in an additional register X of the operation stage 220-b is obtained by processing, by the first sub-module 231, expansion data $w_1$ stored in a 1st expansion register $R_1$ and expansion data $w_2$ stored in a 2nd expansion register $R_2$ of the operation stage 220-a. Specifically, in this example, the first sub-module 231 comprises a $\sigma_0$ operator for performing a $\sigma_0$ operation and an adder ADD1 for performing an addition operation, wherein the expansion data $w_2$ is input to the $\sigma_0$ operator, output of the $\sigma_0$ operator and the expansion data $w_1$ are input to the adder ADD1, and output of the adder ADD1 is provided to the additional register X of the operation stage 220-b, so that $w_x'=w_1+\sigma_0(w_2)$.

As further shown in FIG. 9, expansion data $w_{15}'$ in a 15th expansion register $R_{15}$ of the operation stage 220-b is obtained by processing, by the second sub-module 232, intermediate data $w_x$ stored in an additional register X, expansion data $w_9$ stored in a 9th expansion register $R_9$, and expansion data $w_{14}$ stored in a 14th expansion register $R_{14}$ of the operation stage 220-a. Specifically, in this example, the second sub-module 232 comprises a $\sigma_1$ operator for performing a $\sigma_1$ operation, and a full-adder FAA and an adder ADD2 for performing an addition operation, wherein the expansion data $w_{14}$ is input to the $\sigma_1$ operator, output of the $\sigma_1$ operator, the intermediate data $w_x$, and the expansion data w9 are input to the full-adder FAA, outputs of the full-adder FAA are input to the adder ADD2, and output of the adder ADD2 is provided to the 15th expansion register $R_{15}$ of the operation stage 220-b, so that $w_{15}'=w_x+w_9+\sigma_1(w_{14})$.

As further shown in FIG. 9, expansion data stored in an ith expansion register of the operation stage 220-a is directly shifted into an (i−1)th expansion register of the operation stage 220-b, where $1 \le i \le 15$ and i is an integer.

In the example shown in FIG. 9, the number of operation logic stages experienced by the first sub-module 231 is 2, and the number of operation logic stages experienced by the second sub-module 232 is 3. The first sub-module 231 and the second sub-module 232 can be operated in parallel independently of each other, so that the number of operation logic stages that is required to be experienced in computing the expansion data for the operation stage 220-b is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 1st expansion register $R_1$ and a 10th expansion register $R_{10}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 1st expansion register $R_1$ and a 14th expansion register $R_{14}$ of the first operation stage.

Figure 10:
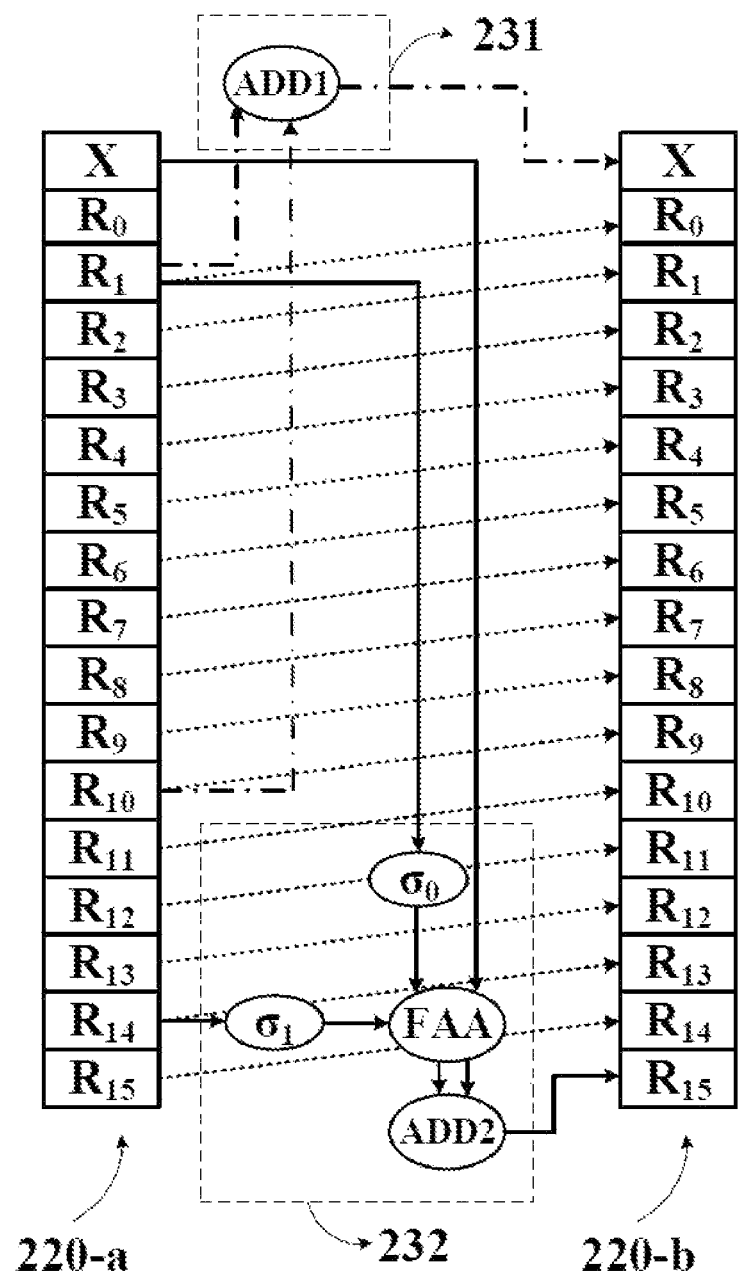

For example, in some examples, as shown in FIG. 10, intermediate data $w_x'$ in an additional register X of the operation stage 220-b is obtained by processing, by the first sub-module 231, expansion data $w_1$ stored in a 1st expansion register $R_1$ and expansion data $w_{10}$ stored in a 10th expansion register $R_{10}$ of the operation stage 220-a. Specifically, in this example, the first sub-module 231 comprises an adder ADD1 for performing an addition operation, wherein the expansion data $w_1$ and the expansion data $w_{10}$ are input to the adder ADD1, output of the adder ADD1 is provided to the additional register X of the operation stage 220-*b*, so that $w_x'=w_1+w_{10}$.

As further shown in FIG. 10, expansion data $w_{15}'$ in a 15th expansion register $R_{15}$ of the operation stage 220-*b* is obtained by processing, by the second sub-module 232, intermediate data $w_x$ stored in an additional register X, expansion data $w_1$ stored in a 1st expansion register $R_1$, and expansion data $w_{14}$ stored in a 14th expansion register $R_{14}$ of the operation stage 220-*a*. Specifically, in this example, the second sub-module 232 comprises a $\sigma_0$ operator for performing a $\sigma_0$ operation, a $\sigma_1$ operator for performing a $\sigma_1$ operation, and a full-adder FAA and an adder ADD2 for performing an addition operation, wherein the expansion data $w_1$ is input to the $\sigma_0$ operator, the expansion data $w_{14}$ is input to the $\sigma_1$ operator, and the $\sigma_0$ operation and the $\sigma_1$ operation can be performed simultaneously, for example. Then, output of the $\sigma_0$ operator, output of the $\sigma_1$ operator, and the intermediate data $w_x$ are input to the full-adder FAA, outputs of the full-adder FAA are input to the adder ADD2, and output of the adder ADD2 is provided to the 15th expansion register $R_{15}$ of the operation stage 220-*b*, so that $w_{15}'=w_x+\sigma_0(w_1)+\sigma_1(w_{14})$.

As further shown in FIG. 10, expansion data stored in an ith expansion register of the operation stage 220-*a* is directly shifted into an (i−1)th expansion register of the operation stage 220-*b*, where 1≤i≤15 and i is an integer.

In the example shown in FIG. 10, the number of operation logic stages experienced by the first sub-module 231 is 1, and the number of operation logic stages experienced by the second sub-module 232 is 3. The first sub-module 231 and the second sub-module 232 can be operated in parallel independently of each other, so that the number of operation logic stages that is required to be experienced in computing the expansion data for the operation stage 220-*b* is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 1st expansion register $R_1$, a 2nd expansion register $R_2$, and a 10th expansion register $R_{10}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 14th expansion register $R_{14}$ of the first operation stage.

Figure 11:
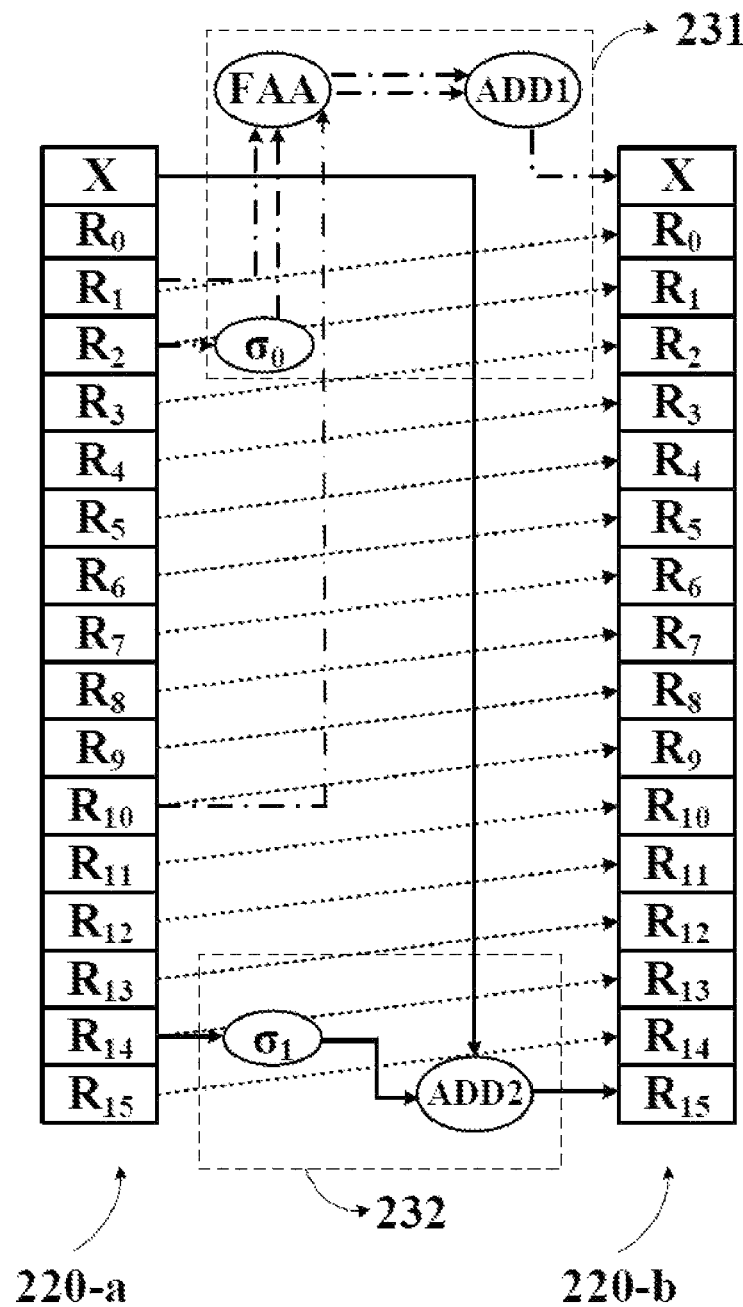

For example, in some examples, as shown in FIG. 11, intermediate data $w_x'$ in an additional register X of the operation stage 220-*b* is obtained by processing, by the first sub-module 231, expansion data $w_1$ stored in a 1st expansion register $R_1$, expansion data $w_2$ stored in a 2nd expansion register $R_2$, and expansion data $w_{10}$ stored in a 10th expansion register $R_{10}$ of the operation stage 220-*a*. Specifically, in this example, the first sub-module 231 comprises a $\sigma_0$ operator for performing a $\sigma_0$ operation, and a full-adder FAA and an adder ADD1 for performing an addition operation, wherein the expansion data $w_2$ is input to the $\sigma_0$ operator, output of the $\sigma_0$ operator, the expansion data $w_1$, and the expansion data $w_{10}$ are input to the full-adder FAA, outputs of the full-adder FAA are input to the adder ADD1, and output of the adder ADD1 is provided to the additional register X of the operation stage 220-*b*, so that $w_x'=w_1+\sigma_0(w_2)+w_{10}$.

As further shown in FIG. 11, expansion data $w_{15}'$ in a 15th expansion register $R_{15}$ of the operation stage 220-*b* is obtained by processing, by the second sub-module 232, intermediate data $w_x$ stored in an additional register X and expansion data $w_{14}$ stored in the 14th expansion register $R_{14}$ of the operation stage 220-*a*. Specifically, in this example, the second sub-module 232 comprises a $\sigma_1$ operator for performing a $\sigma_1$ operation and an adder ADD2 for performing an addition operation, wherein the expansion data $w_{14}$ is input to the $\sigma_1$ operator, output of the $\sigma_1$ operator and the intermediate data $w_x$ are input to the adder ADD2, and output of the adder ADD2 is provided to the 15th expansion register $R_{15}$ of the operation stage 220-*b*, so that $w_{15}'=w_x+\sigma_1(w_{14})$.

As further shown in FIG. 11, expansion data stored in an ith expansion register of the operation stage 220-*a* is directly shifted into an (i−1)th expansion register of the operation stage 220-*b*, where 1≤i≤15 and i is an integer.

In the example shown in FIG. 11, the number of operation logic stages experienced by the first sub-module 231 is 3, and the number of operation logic stages experienced by the second sub-module 232 is 2. The first sub-module 231 and the second sub-module 232 can be operated in parallel independently of each other, so that the number of operation logic stages that is required to be experienced in computing the expansion data for the operation stage 220-*b* is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 1st expansion register $R_1$ and a 15th expansion register $R_{15}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 1st expansion register $R_1$ and a 9th expansion register $R_9$ of the first operation stage.

Figure 12:
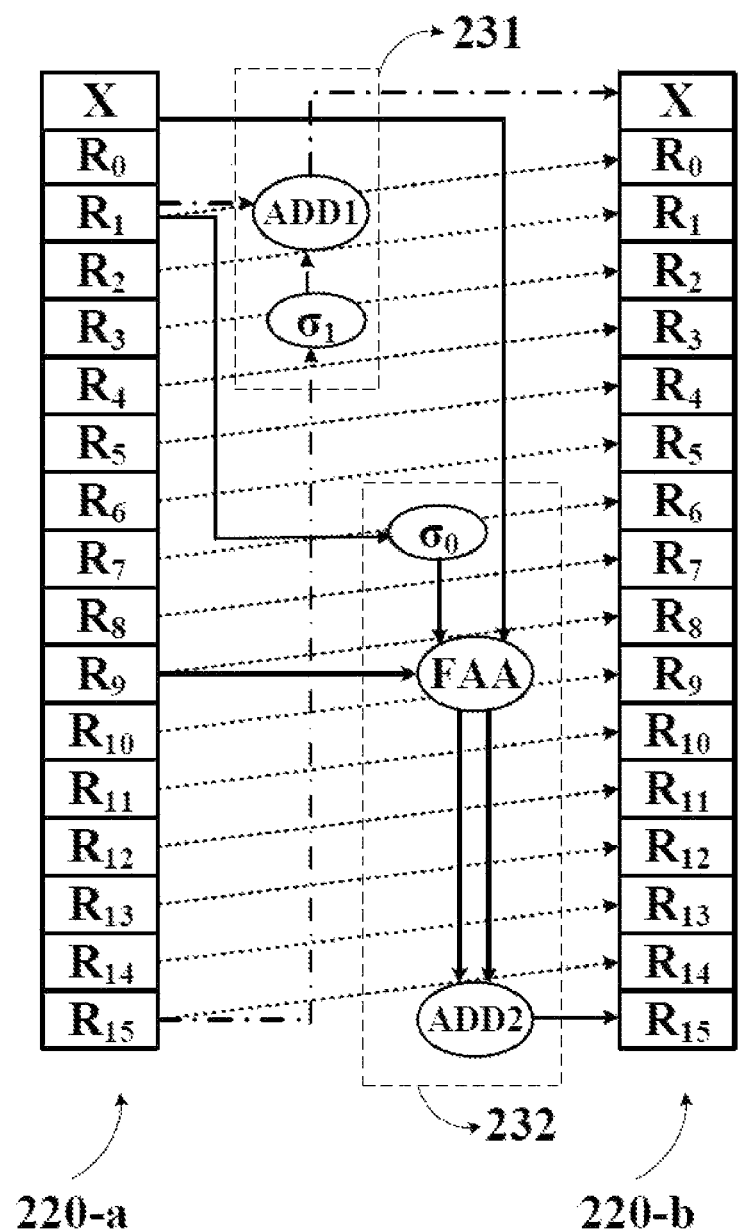

For example, in some examples, as shown in FIG. 12, intermediate data $w_x'$ in an additional register X of the operation stage 220-*b* is obtained by processing, by the first sub-module 231, expansion data $w_1$ stored in a 1st expansion register $R_1$ and expansion data $w_{15}$ stored in a 15th expansion register $R_{15}$ of the operation stage 220-*a*. Specifically, in this example, the first sub-module 231 comprises a $\sigma_1$ operator for performing a $\sigma_1$ operation and an adder ADD1 for performing an addition operation, wherein the expansion data $w_{15}$ is input to the $\sigma_1$ operator, output of the $\sigma_1$ operator and the expansion data $w_1$ are input to the adder ADD1, and output of the adder ADD1 is provided to the additional register X of the operation stage 220-*b*, so that $w_x'=w_1+\sigma_1(w_{15})$.

As further shown in FIG. 12, expansion data $w_{15}'$ in a 15th expansion register $R_{15}$ of the operation stage 220-*b* is obtained by processing, by the second sub-module 232, intermediate data $w_x$ stored in an additional register X, expansion data $w_1$ stored in a 1st expansion register $R_1$, and expansion data $w_9$ stored in a 9th expansion register $R_9$ of the operation stage 220-*a*. Specifically, in this example, the second sub-module 232 comprises a $\sigma_0$ operator for performing a $\sigma_0$ operation, and a full-adder FAA and an adder ADD2 for performing an addition operation, wherein the expansion data $w_1$ is input to the $\sigma_0$ operator, output of the $\sigma_0$ operator, the intermediate data $w_x$, and the expansion data $w_9$ are input to the full-adder FAA, outputs of the full-adder FAA are input to the adder ADD2, and output of the adder ADD2 is provided to the 15th expansion register $R_{15}$ of the operation stage 220-b, so that $w_{15}'=w_x+\sigma_0(w_1)+w_9$.

As further shown in FIG. 12, expansion data stored in an ith expansion register of the operation stage 220-a is directly shifted into an (i−1)th expansion register of the operation stage 220-b, where 1≤i≤15 and i is an integer.

In the example shown in FIG. 12, the number of operation logic stages experienced by the first sub-module 231 is 2, and the number of operation logic stages experienced by the second sub-module 232 is 3. The first sub-module 231 and the second sub-module 232 can be operated in parallel independently of each other, so that the number of operation logic stages that is required to be experienced in computing the expansion data for the operation stage 220-b is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 1st expansion register $R_1$, a 2nd expansion register $R_2$, and a 15th expansion register $R_{15}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 9th expansion register $R_9$ of the first operation stage. Specifically, in some examples, intermediate data $w_x'$ in an additional register X of the operation stage 220-b can be obtained by processing, by the first sub-module 231, expansion data $w_1$ stored in a 1st expansion register $R_1$, expansion data $w_2$ stored in a 2nd expansion register $R_2$ and expansion data $w_{15}$ stored in a 15th expansion register $R_{15}$ of the operation stage 220-a, and expansion data $w_{15}'$ in a 15th expansion register $R_{15}$ of the operation stage 220-b can be obtained by processing, by the second sub-module 232, intermediate data $w_x$ stored in an additional register X of the operation stage 220-a and expansion data $w_9$ stored in a 9th expansion register $R_9$ of the operation stage 220-a, so that $w_x'=w_1+\sigma_0(w_2)+\sigma_1(w_{15})$, $w_{15}'=w_x+w_9$.

In some embodiments, the first sub-module 231 can be configured to compute intermediate data for storage into an additional register X of the second operation stage based on expansion data stored in a 1st expansion register $R_1$, a 10th expansion register $R_{10}$, and a 15th expansion register $R_{15}$ of the first operation stage, and the second sub-module 232 can be configured to compute expansion data for storage into a 15th expansion register of the second operation stage based on intermediate data stored in an additional register X of the first operation stage and expansion data stored in a 1st expansion register $R_1$ of the first operation stage. Specifically, in some examples, intermediate data $w_x'$ in an additional register X of the operation stage 220-b can be obtained by processing, by the first sub-module 231, expansion data $w_1$ stored in a 1st expansion register $R_1$, expansion data $w_{10}$ stored in a 10th expansion register $R_{10}$ and expansion data $w_{15}$ stored in a 15th expansion register $R_{15}$ of the operation stage 220-a, and expansion data $w_{15}'$ in a 15th expansion register $R_{15}$ of the operation stage 220-b can be obtained by processing, by the second sub-module 232, intermediate data $w_x$ in an additional register X of the operation stage 220-a and expansion data $w_1$ stored in a 1st expansion register $R_1$ of the operation stage 220-a, so that $w_x'=w_1+w_{10}+\sigma_1(w_{15})$, $w_{15}'=w_x+\sigma_0(w_1)$.

In some embodiments, the first sub-module 231 can be configured to compute intermediate data for storage into an additional register X of the second operation stage based on expansion data stored in a 2nd expansion register $R_2$ and a 10th expansion register $R_{10}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 0th expansion register $R_0$ and a 14th expansion register $R_{14}$ of the first operation stage.

Figure 13:
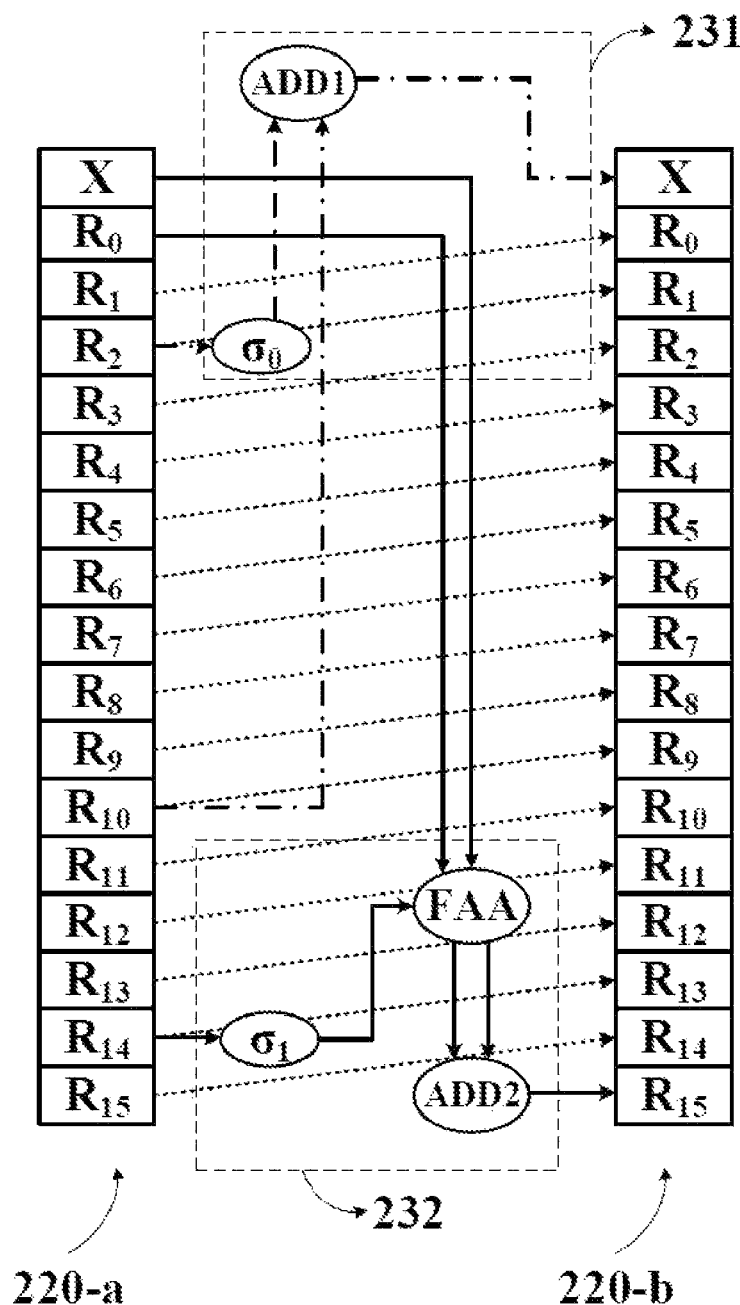

For example, in some examples, as shown in FIG. 13, intermediate data $w_x'$ in an additional register X of the operation stage 220-b is obtained by processing, by the first sub-module 231, expansion data $w_2$ stored in a 2nd expansion register $R_2$ and expansion data $w_{10}$ stored in a 10th expansion register $R_{10}$ of the operation stage 220-a. Specifically, in this example, the first sub-module 231 comprises a $\sigma_0$ operator for performing a $\sigma_0$ operation and an adder ADD1 for performing an addition operation, wherein the expansion data $w_2$ is input to the $\sigma_0$ operator, output of the $\sigma_0$ operator and the expansion data $w_{10}$ are input to the adder ADD1, and output of the adder ADD1 is provided to the additional register X of the operation stage 220-b, so that $w_x'=\sigma_0(w_2)+w_{10}$.

As further shown in FIG. 13, expansion data $w_{15}'$ in a 15th expansion register $R_{15}$ of the operation stage 220-b is obtained by processing, by the second sub-module 232, intermediate data $w_x$ stored in an additional register X, expansion data $w_0$ stored in a 0th expansion register $R_0$, and expansion data $w_{14}$ stored in a 14th expansion register $R_{14}$ of the operation stage 220-a. Specifically, in this example, the second sub-module 232 comprises a $\sigma_1$ operator for performing a $\sigma_1$ operation, and a full-adder FAA and an adder ADD2 for performing an addition operation, wherein the expansion data $w_{14}$ is input to the $\sigma_1$ operator, output of the $\sigma_1$ operator, the intermediate data $w_x$, and the expansion data $w_0$ are input to the full-adder FAA, outputs of the full-adder FAA are input to the adder ADD2, and output of the adder ADD2 is provided to the 15th expansion register $R_{15}$ of the operation stage 220-b, so that $w_{15}'=w_x+w_0+\sigma_1(w_{14})$.

As further shown in FIG. 13, expansion data stored in an ith expansion register of the operation stage 220-a is directly shifted into an (i−1)th expansion register of the operation stage 220-b, where 1≤i≤15 and i is an integer.

In the example shown in FIG. 13, the number of operation logic stages experienced by the first sub-module 231 is 2, and the number of operation logic stages experienced by the second sub-module 232 is 3. The first sub-module 231 and the second sub-module 232 can be operated in parallel independently of each other, so that the number of operation logic stages that is required to be experienced in computing the expansion data for the operation stage 220-b is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 2nd expansion register $R_2$, a 10th expansion register $R_{10}$, and a 15th expansion register $R_{15}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 0th expansion register $R_0$ of the first operation stage.

Figure 14:
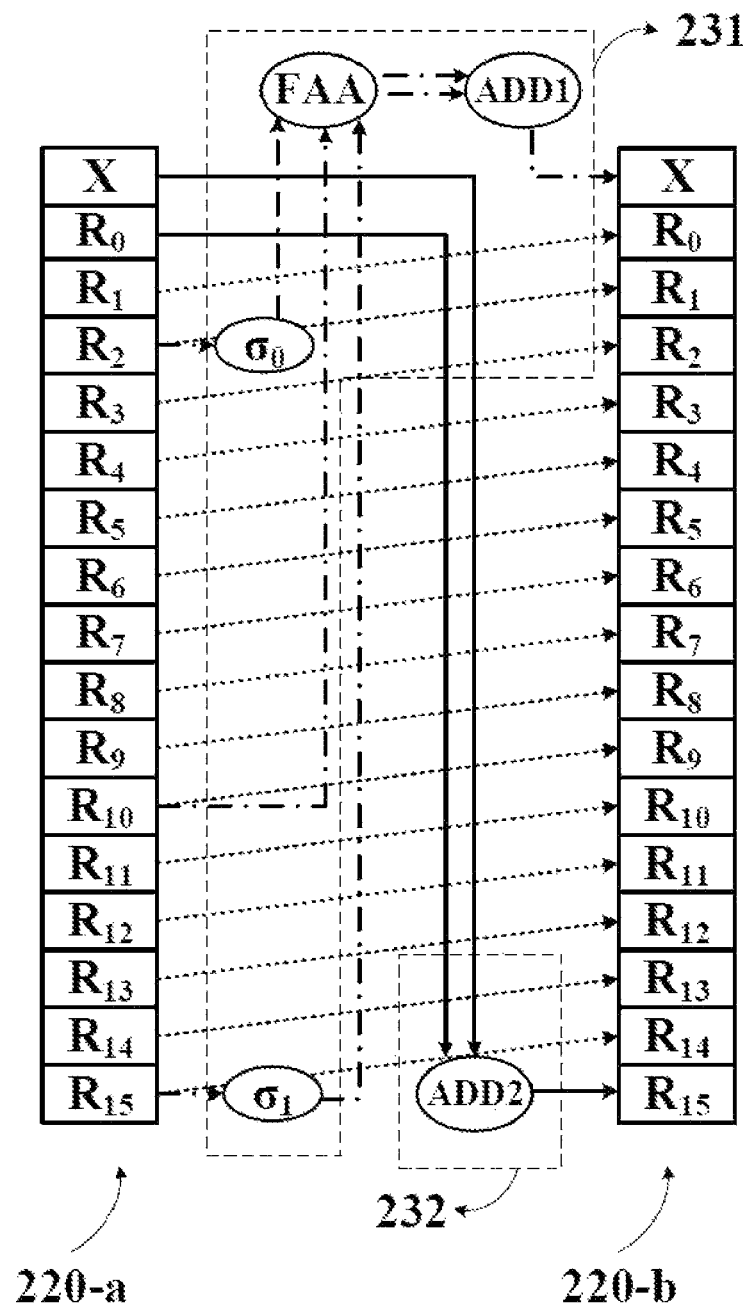

For example, in some examples, as shown in FIG. 14, intermediate data $w_x'$ in an additional register X of the operation stage 220-$b$ is obtained by processing, by the first sub-module 231, expansion data $w_2$ stored in a 2nd expansion register $R_2$, expansion data $w_{10}$ stored in a 10th expansion register $R_{10}$, and expansion data $w_{15}$ stored in a 15th expansion register $R_{15}$ of the operation stage 220-$a$. Specifically, in this example, the first sub-module 231 comprises a $\sigma_0$ operator for performing a $\sigma_0$ operation, a $\sigma_1$ operator for performing a $\sigma_1$ operation, and a full-adder FAA and an adder ADD1 for performing an addition operation, wherein the expansion data $w_2$ is input to the $\sigma_0$ operator, the expansion data $w_{15}$ is input to the $\sigma_1$ operator, and the $\sigma_0$ operation and the $\sigma1$ operation can be performed simultaneously. Then, output of the $\sigma_0$ operator, output of the $\sigma_1$ operator, and the expansion data $w_{10}$ are input to the full-adder FAA, outputs of the full-adder FAA are input to the adder ADD1, and output of the adder ADD1 is provided to the additional register X of the operation stage 220-$b$, so that $w_x'=\sigma_0(w_2)+w_{10}+\sigma_1(w_{15})$.

As further shown in FIG. 14, expansion data $w_{15}'$ in a 15th expansion register $R_{15}$ of the operation stage 220-$b$ is obtained by processing, by the second sub-module 232, intermediate data $w_x$ stored in an additional register X and expansion data $w_0$ stored in a 0th expansion register $R_0$ of the operation stage 220-$a$. Specifically, in this example, the second sub-module 232 comprises an adder ADD2, wherein the intermediate data $w_x$ and the expansion data $w_0$ are input to the adder ADD2, and output of the adder ADD2 is provided to the 15th expansion register $R_{15}$ of the operation stage 220-$b$, so that $w_{15}'=w_x+w_0$.

As further shown in FIG. 14, expansion data stored in an ith expansion register of the operation stage 220-$a$ is directly shifted into an (i−1)th expansion register of the operation stage 220-$b$, where 1≤i≤15 and i is an integer.

In the example shown in FIG. 14, the number of operation logic stages experienced by the first sub-module 231 is 3, and the number of operation logic stages experienced by the second sub-module 232 is 1. The first sub-module 231 and the second sub-module 232 can be operated in parallel independently of each other, so that the number of operation logic stages that is required to be experienced in computing the expansion data for the operation stage 220-$b$ is finally reduced to 3, and the computation latency is greatly reduced, which makes the operation speed of the pipeline structure significantly improved.

In some embodiments, the first sub-module 231 can be configured to compute intermediate data for storage into an additional register X of the second operation stage based on expansion data stored in a 2nd expansion register $R_2$ and a 15th expansion register $R_{15}$ of the first operation stage, and the second sub-module can be configured to compute expansion data for storage into a 15th expansion register $R_{15}$ of the second operation stage based on intermediate data stored in an additional register X of the first operation stage and expansion data stored in a 0th expansion register $R_0$ and a 9th expansion register $R_9$ of the first operation stage. Specifically, in some examples, intermediate data $w_x'$ in an additional register X of the operation stage 220-$b$ can be obtained by processing, by the first sub-module 231, expansion data $w_2$ stored in a 2nd expansion register $R_2$ and expansion data $w_{15}$ stored in a 15th expansion register $R_{15}$ of the operation stage 220-$a$, and expansion data $w_{15}'$ in a 15th expansion register $R_{15}$ of the operation stage 220-$b$ can be obtained by processing, by the second sub-module 232, intermediate data $w_x$ in an additional register X of the operation stage 220-$a$ and expansion data $w_0$ stored in a 0th expansion register $R_0$ and expansion data $w_9$ stored in a 9th expansion register $R_9$ of the operation stage 220-$a$, so that $w_x'=\sigma_0(w_2)+\sigma_1(w_{15})$, $w_{15}'=w_x+w_0+w_9$.

In some embodiments, the first sub-module 231 can be configured to compute intermediate data for storage into an additional register X of the second operation stage based on expansion data stored in a 10th expansion register $R_{10}$ and a 15th expansion register $R_{15}$ of the first operation stage, and the second sub-module 232 can be configured to compute expansion data for storage into a 15th expansion register $R_{15}$ of the second operation stage based on intermediate data stored in an additional register X of the first operation stage and expansion data stored in a 0th expansion register $R_0$ and a 1st expansion register R1 of the first operation stage. Specifically, in some examples, intermediate data $w_x'$ in an additional register X of the operation stage 220-$b$ can be obtained by processing, by the first sub-module 231, expansion data $w_{10}$ stored in a 10th expansion register $R_{10}$ and expansion data $w_{15}$ stored in a 15th expansion register $R_{15}$ of the operation stage 220-$a$, and expansion data $w_{15}'$ in a 15th expansion register $R_{15}$ of the operation stage 220-$b$ can be obtained by processing, by the second sub-module 232, intermediate data $w_x$ in an additional register X of the operation stage 220-$a$ and expansion data $w_0$ stored in a 0th expansion register $R_0$ and expansion data $w_1$ stored in a 1st expansion register $R_1$ of the operation stage 220-$a$, so that $w_x'=w_{10}+\sigma_1(w_{15})$, $w_{15}'=w_x+w_0+\sigma_0(w_1)$.

Figure 16:
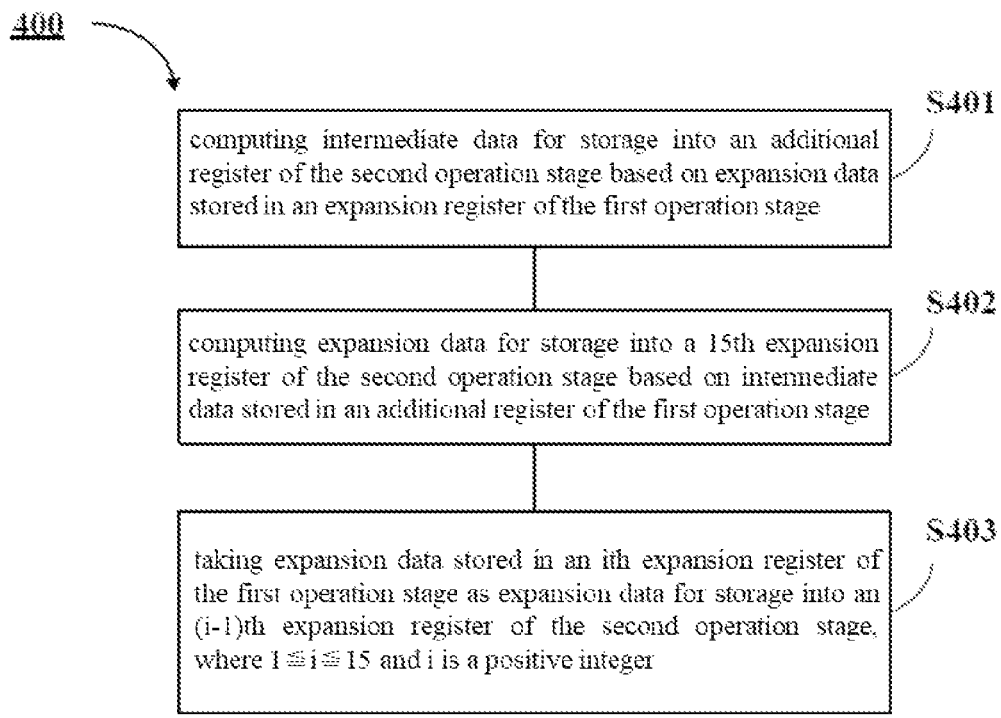

Accordingly, the present disclosure also provides a method of computing expansion data in a circuit for performing a hash algorithm. FIG. 16 shows an exemplary flow diagram of a method 400 of computing expansion data in a circuit for performing a hash algorithm according to embodiments of the present disclosure. Such a circuit can comprise an input module configured to receive data and an operation module configured to compute a hash value based on the received data, wherein the operation module can comprise a plurality of operation stages arranged in a pipeline structure, each operation stage can comprise 0th to 15th expansion registers and an additional register, each expansion register can be configured to store expansion data of the current operation stage, and the additional register can be configured to store intermediate data for computing expansion data. In some embodiments, intermediate data stored in an additional register of a most preceding operation stage and expansion data stored in a 0th expansion register of the most preceding operation stage can be the same. For two adjacent operation stages of the plurality of operation stages of the operation module which comprise a first operation stage and a second operation stage after the first operation stage, the method 400 can comprise: at S401, computing intermediate data for storage into an additional register of the second operation stage based on expansion data stored in an expansion register of the first operation stage; at S402, computing expansion data for storage into a 15th expansion register of the second operation stage based on intermediate data stored in an additional register of the first operation stage; and at S403, taking expansion data stored in an ith expansion register of the first operation stage as expansion data for storage into an (i-1)th expansion register of the second operation stage, where 1≤i≤15 and i is an integer. Note that S401 to S403 do not need to be performed in sequential order, but can be performed in any order, or can be performed at least partially in parallel.

In some embodiments, the computation of the intermediate data for storage into the additional register of the second operation stage and the computation of the expansion data for storage into the 15th expansion register of the second operation stage can be performed simultaneously.

In some embodiments, expansion data stored in a 15th expansion register of a subsequent operation stage of the second operation stage can be determined based on expansion data stored in a 1st expansion register, a 2nd expansion register, a 10th expansion register, and a 15th expansion register of the first operation stage.

The method 400 can further compute expansion data in various ways described above with respect to the first sub-module 231 and the second sub-module 232, which are not repeated herein. The method 400 can reduce the computation latency caused by computing the expansion data in the circuit for performing the hash algorithm, thereby significantly improving the operation speed of the circuit and thus of a computing chip containing the circuit, thereby achieving a lower ratio of power consumption to hash rate.

The present disclosure can further provide a computing chip comprising the circuit as described in any of the above embodiments. The present disclosure can further provide a data processing device comprising one or more computing chips as described above. A data processing device according to the present disclosure, for example, as a crypto currency mining machine, can achieve a lower ratio of power consumption to hash rate, thereby performing a mining process with lower cost and greater efficiency.

Terms "left", "right", "front", "back", "top", "bottom", "up", "down", "high", "low" and the like in the specification and claims, if any, are used for descriptive purposes and not necessarily for describing permanent relative positions. It should be understood that the terms so used are interchangeable where appropriate such that the embodiments of the present disclosure described herein are, for example, capable of operation in other orientations different from those shown or otherwise described herein. For example, when a device in the drawings is turned upside down, a feature originally described as "above" other features can be described as "below" the other features at this time. The device can also be otherwise oriented (rotated 90 degrees or in other orientations), and at this time, relative spatial relations will be interpreted accordingly.

In the specification and claims, when it is described that one element is "on", "attached to", "connected to", "coupled to", or "in contact with" another element, and so on, the element can be directly on, directly attached to, directly connected to, directly coupled to, or in direct contact with the other element, or one or more intermediate elements can be present. In contrast, when it is described that one element is "directly on", "directly attached to", "directly connected to", "directly coupled to", or "in direct contact with" another element, no intermediate elements will be present. In the specification and claims, one feature is arranged "adjacent" to another feature, which can refer to the one feature having a portion overlapping with the adjacent feature or a portion above or below the adjacent feature.

As used herein, a term "exemplary" means "serving as an example, instance, or illustration", and not as a "model" that is to be reproduced exactly. Any implementation exemplarily described herein is not necessarily to be construed as preferred or advantageous over other implementations. Furthermore, the present disclosure is not limited by any expressed or implied theory presented in the technical field, background, summary or detailed description. As used herein, a term "substantially" means to encompass any minor variations caused by design or manufacturing imperfections, tolerances of devices or components, environmental effects and/or other factors. The term "substantially" also allows for differences from a perfect or ideal situation caused by parasitics, noise, and other practical considerations that may exist in a practical implementation.

In addition, for reference purposes only, similar terms such as "first", "second" can also be used herein, and thus are not intended to be limiting. For example, unless clearly indicated by the context, the terms "first," "second," and other such numerical terms involving structures or elements do not imply a sequence or order. It will be further understood that terms "comprise/include", when used herein, specify the presence of stated features, entireties, steps, operations, units, and/or components, but do not preclude the presence or addition of one or more other features, entireties, steps, operations, units, components, and/or combinations thereof. In the present disclosure, a term "providing" is used broadly to encompass all ways of obtaining an object, and thus "providing an object" includes, but is not limited to, "purchasing", "preparing/manufacturing", "arranging/setting", "installing/assembling", and/or "ordering" the object, and so on.

As used herein, terms "and/or" includes any and all combinations of one or more of associated listed items. Terms used herein is for the purpose of describing specific embodiments only and is not intended to limit the present disclosure. As used herein, singular forms "a", "an" and "the" are intended to include plural forms as well, unless clearly indicated by the context otherwise.

Those skilled in the art should realize that boundaries between the above described operations are merely illustrative. Multiple operations can be combined into a single operation, the single operation can be distributed in additional operations, and the execution of the operations can be at least partially overlapped in time. Moreover, an alternative embodiment can comprise multiple instances of a specific operation, and the order of operations can be altered in various other embodiments. However, other modifications, variations, and alternatives are also possible. Aspects and elements of all the embodiments disclosed above can be combined in any manner and/or in combination with aspects or elements of other embodiments to provide multiple additional embodiments. Accordingly, this specification and the accompanying drawings should be regarded as illustrative rather than restrictive.

While some specific embodiments of the present disclosure have been described in detail through examples, it should be understood by those skilled in the art that the above examples are for illustration only and are not intended to limit the scope of the present disclosure. The embodiments disclosed herein can be combined arbitrarily without departing from the spirit and scope of the present disclosure. Those skilled in the art will also appreciate that various modifications can be made to the embodiments without departing from the scope and spirit of the present disclosure. The scope of the present disclosure is defined by the appended claims.

What is claimed is:

1. A circuit for performing a hash algorithm, comprising:
   an input module configured to receive data; and
   an operation module configured to compute a hash value based on the received data, the operation module comprising:
   a plurality of operation stages arranged in a pipeline structure, each operation stage of the plurality of operation stages comprising 0th to 15th expansion registers, each expansion register being configured to store expansion data of the current operation stage; and a plurality of expansion data operation logic modules, each expansion data operation logic module being disposed between two respective adjacent operation stages of the plurality of operation stages, the two adjacent operation stages comprising a first operation stage and a second operation stage after the first operation stage, each expansion data operation logic module comprising:
- a first sub-module configured to compute expansion data for storage into a 0th expansion register of the second operation stage based on expansion data stored in a 1st expansion register of the first operation stage; and
- a second sub-module configured to compute expansion data for storage into a 15th expansion register of the second operation stage based on expansion data stored in a 0th expansion register of the first operation stage, wherein expansion data for storage into an (i-1)th expansion register of the second operation stage is expansion data stored in an ith expansion register of the first operation stage, where 2≤i≤15 and i is an integer.

2. The circuit according to claim 1, wherein
the first sub-module is configured to compute expansion data for storage into a 0th expansion register of the second operation stage based on expansion data stored in a 1st expansion register and a 2nd expansion register of the first operation stage; and
the second sub-module is configured to compute expansion data for storage into a 15th expansion register of the second operation stage based on expansion data stored in a 0th expansion register, a 9th expansion register, and a 14th expansion register of the first operation stage.

3. The circuit according to claim 1, wherein
the first sub-module is configured to compute expansion data for storage into a 0th expansion register of the second operation stage based on expansion data stored in a 1st expansion register and a 10th expansion register of the first operation stage; and
the second sub-module is configured to compute expansion data for storage into a 15th expansion register of the second operation stage based on expansion data stored in a 0th expansion register, a 1st expansion register, and a 14th expansion register of the first operation stage.

4. The circuit according to claim 1, wherein
the first sub-module is configured to compute expansion data for storage into a 0th expansion register of the second operation stage based on expansion data stored in a 1st expansion register, a 2nd expansion register, and a 10th expansion register of the first operation stage; and
the second sub-module is configured to compute expansion data for storage into a 15th expansion register of the second operation stage based on expansion data stored in a 0th expansion register and a 14th expansion register of the first operation stage.

5. The circuit according to claim 1, wherein
the first sub-module is configured to compute expansion data for storage into a 0th expansion register of the second operation stage based on expansion data stored in a 1st expansion register and a 15th expansion register of the first operation stage; and
the second sub-module is configured to compute expansion data for storage into a 15th expansion register of the second operation stage based on expansion data stored in a 0th expansion register, a 1st expansion register, and a 9th expansion register of the first operation stage.

6. The circuit according to claim 1, wherein
the first sub-module is configured to compute expansion data for storage into a 0th expansion register of the second operation stage based on expansion data stored in a 1st expansion register, a 2nd expansion register, and a 15th expansion register of the first operation stage; and
the second sub-module is configured to compute expansion data for storage into a 15th expansion register of the second operation stage based on expansion data stored in a 0th expansion register and a 9th expansion register of the first operation stage.

7. The circuit according to claim 1, wherein
the first sub-module is configured to compute expansion data for storage into a 0th expansion register of the second operation stage based on expansion data stored in a 1st expansion register, a 10th expansion register, and a 15th expansion register of the first operation stage; and
the second sub-module is configured to compute expansion data for storage into a 15th expansion register of the second operation stage based on expansion data stored in a 0th expansion register and a 1st expansion register of the first operation stage.

8. A circuit for performing a hash algorithm, comprising:
an input module configured to receive data; and
an operation module configured to compute a hash value based on the received data, the operation module comprising:
- a plurality of operation stages arranged in a pipeline structure, each operation stage of the plurality of operation stages comprising 0th to 15th expansion registers and an additional register, each expansion register being configured to store expansion data of the current operation stage, the additional register being configured to store intermediate data for computing expansion data; and
- a plurality of expansion data operation logic modules, each expansion data operation logic module being disposed between two respective adjacent operation stages of the plurality of operation stages, the two adjacent operation stages comprising a first operation stage and a second operation stage after the first operation stage, each expansion data operation logic module comprising:
  - a first sub-module configured to compute intermediate data for storage into an additional register of the second operation stage based on expansion data stored in an expansion register of the first operation stage; and
  - a second sub-module configured to compute expansion data for storage into a 15th expansion register of the second operation stage based on intermediate data stored in an additional register of the first operation stage, wherein expansion data for storage into an (i-1)th expansion register of the second operation stage is expansion data stored in an ith expansion register of the first operation stage, where 1≤i≤15 and i is an integer.

9. The circuit according to claim 8, wherein
the first sub-module is configured to compute intermediate data for storage into an additional register of the second operation stage based on expansion data stored in a 1st expansion register and a 2nd expansion register of the first operation stage; and
the second sub-module is configured to compute expansion data for storage into a 15th expansion register of the second operation stage based on intermediate data stored in an additional register of the first operation stage and expansion data stored in a 9th expansion register and a 14th expansion register of the first operation stage.

10. The circuit according to claim 8, wherein
the first sub-module is configured to compute intermediate data for storage into an additional register of the second operation stage based on expansion data stored in a 1st expansion register and a 10th expansion register of the first operation stage; and
the second sub-module is configured to compute expansion data for storage into a 15th expansion register of the second operation stage based on intermediate data stored in an additional register of the first operation stage and expansion data stored in a 1st expansion register and a 14th expansion register of the first operation stage.

11. The circuit according to claim 8, wherein
the first sub-module is configured to compute intermediate data for storage into an additional register of the second operation stage based on expansion data stored in a 1st expansion register, a 2nd expansion register, and a 10th expansion register of the first operation stage; and
the second sub-module is configured to compute expansion data for storage into a 15th expansion register of the second operation stage based on intermediate data stored in an additional register of the first operation stage and expansion data stored in a 14th expansion register of the first operation stage.

12. The circuit according to claim 8, wherein
the first sub-module is configured to compute intermediate data for storage into an additional register of the second operation stage based on expansion data stored in a 1st expansion register and a 15th expansion register of the first operation stage; and
the second sub-module is configured to compute expansion data for storage into a 15th expansion register of the second operation stage based on intermediate data stored in an additional register of the first operation stage and expansion data stored in a 1st expansion register and a 9th expansion register of the first operation stage.

13. The circuit according to claim 8, wherein
the first sub-module is configured to compute intermediate data for storage into an additional register of the second operation stage based on expansion data stored in a 1st expansion register, a 2nd expansion register, and a 15th expansion register of the first operation stage; and
the second sub-module is configured to compute expansion data for storage into a 15th expansion register of the second operation stage based on intermediate data stored in an additional register of the first operation stage and expansion data stored in a 9th expansion register of the first operation stage.

14. The circuit according to claim 8, wherein
the first sub-module is configured to compute intermediate data for storage into an additional register of the second operation stage based on expansion data stored in a 1st expansion register, a 10th expansion register, and a 15th expansion register of the first operation stage; and
the second sub-module is configured to compute expansion data for storage into a 15th expansion register of the second operation stage based on intermediate data stored in an additional register of the first operation stage and expansion data stored in a 1st expansion register of the first operation stage.

15. The circuit according to claim 8, wherein
the first sub-module is configured to compute intermediate data for storage into an additional register of the second operation stage based on expansion data stored in a 2nd expansion register and a 10th expansion register of the first operation stage; and
the second sub-module is configured to compute expansion data for storage into a 15th expansion register of the second operation stage based on intermediate data stored in an additional register of the first operation stage and expansion data stored in a 0th expansion register and a 14th expansion register of the first operation stage.

16. The circuit according to claim 8, wherein
the first sub-module is configured to compute intermediate data for storage into an additional register of the second operation stage based on expansion data stored in a 2nd expansion register and a 15th expansion register of the first operation stage; and
the second sub-module is configured to compute expansion data for storage into a 15th expansion register of the second operation stage based on intermediate data stored in an additional register of the first operation stage and expansion data stored in a 0th expansion register and a 9th expansion register of the first operation stage.

17. The circuit according to claim 8, wherein
the first sub-module is configured to compute intermediate data for storage into an additional register of the second operation stage based on expansion data stored in a 2nd expansion register, a 10th expansion register, and a 15th expansion register of the first operation stage; and
the second sub-module is configured to compute expansion data for storage into a 15th expansion register of the second operation stage based on intermediate data stored in an additional register of the first operation stage and expansion data stored in a 0th expansion register of the first operation stage.

18. The circuit according to claim 8, wherein
the first sub-module is configured to compute intermediate data for storage into an additional register of the second operation stage based on expansion data stored in a 10th expansion register and a 15th expansion register of the first operation stage; and
the second sub-module is configured to compute expansion data for storage into a 15th expansion register of the second operation stage based on intermediate data stored in an additional register of the first operation stage and expansion data stored in a 0th expansion register and a 1st expansion register of the first operation stage.

19. A computing chip comprising the circuit according to claim 1.

20. A data processing device comprising one or more computing chips according to claim 19.

* * * * *